(12) United States Patent
Yoshida et al.

(10) Patent No.: US 12,182,197 B2
(45) Date of Patent: *Dec. 31, 2024

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventors: Noboru Yoshida, Tokyo (JP); Yadong Pan, Tokyo (JP); Ryo Kawai, Tokyo (JP); Jianquan Liu, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 18/009,155

(22) PCT Filed: Jun. 10, 2020

(86) PCT No.: PCT/JP2020/022815
§ 371 (c)(1),
(2) Date: Dec. 8, 2022

(87) PCT Pub. No.: WO2021/250808
PCT Pub. Date: Dec. 16, 2021

(65) Prior Publication Data
US 2023/0214421 A1    Jul. 6, 2023

(51) Int. Cl.
*G06F 16/583* (2019.01)
*G06F 16/532* (2019.01)
(Continued)

(52) U.S. Cl.
CPC ........ *G06F 16/5854* (2019.01); *G06F 16/532* (2019.01); *G06T 7/62* (2017.01);
(Continued)

(58) Field of Classification Search
None
See application file for complete search history.

(56) References Cited

U.S. PATENT DOCUMENTS

| 6,459,824 B1* | 10/2002 | Lee | G06V 10/757 |
| | | | 382/209 |
| 2004/0103108 A1* | 5/2004 | Andreev | G06F 16/285 |
| | | | 706/50 |

(Continued)

FOREIGN PATENT DOCUMENTS

| JP | 2002-007469 A | 1/2002 |
| JP | 2006-260405 A | 9/2006 |

(Continued)

OTHER PUBLICATIONS

International Search Report for PCT Application No. PCT/JP2020/022815, mailed on Sep. 1, 2020.
(Continued)

*Primary Examiner* — Alex Gofman
*Assistant Examiner* — Umar Mian

(57) ABSTRACT

The present invention provides an image processing apparatus including: an image acquisition unit acquiring a candidate of a query image; a skeletal structure detection unit detecting a two-dimensional skeletal structure of a person included in a candidate of the query image; a query evaluation unit computing an evaluation value of a candidate of the query image, based on a detection result of the two-dimensional skeletal structure; a selection unit selecting a query image out of candidates of the query image, based on the evaluation value; a feature value computation unit computing a feature value of the two-dimensional skeletal structure detected from the query image; and a retrieval unit retrieving an analysis target image including a person in a pose similar to a pose of a person included in the query image out of analysis target images, based on a degree of similarity of the computed feature value.

13 Claims, 44 Drawing Sheets

(51) Int. Cl.
*G06T 7/62* (2017.01)
*G06T 7/73* (2017.01)
*G06V 10/44* (2022.01)
*G06V 10/74* (2022.01)

(52) U.S. Cl.
CPC ............... *G06T 7/73* (2017.01); *G06V 10/44* (2022.01); *G06V 10/761* (2022.01); *G06T 2207/20044* (2013.01); *G06T 2207/30196* (2013.01)

(56) References Cited

U.S. PATENT DOCUMENTS

| | | | |
|---|---|---|---|
| 2013/0028517 | A1 | 1/2013 | Yoo et al. |
| 2018/0038796 | A1* | 2/2018 | Ichitani ..................... G06T 1/00 |
| 2019/0147292 | A1* | 5/2019 | Watanabe ........... G06F 16/5838 |
| | | | 382/103 |
| 2019/0347826 | A1* | 11/2019 | Zhang ....................... G06N 3/08 |
| 2022/0121884 | A1* | 4/2022 | Zadeh ..................... G06N 3/043 |

FOREIGN PATENT DOCUMENTS

| | | |
|---|---|---|
| JP | 2011-039854 A | 2/2011 |
| JP | 2014-522035 A | 8/2014 |
| JP | 2016-162414 A | 9/2016 |
| JP | 2019-091138 A | 6/2019 |
| JP | 2019-096113 A | 6/2019 |

OTHER PUBLICATIONS

Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, pp. 7291 to 7299.

Sagawa, Yuichi, Shimosaka, Masamichi, Mori, Taketoshi, Sato, Tomomasa, "Fast Online Human Pose Estimation via 3D Voxel Data". Journal of the Robotics Society of Japan. Nov. 15, 2008, pp. 55-66.

JP Office Action for JP Application No. 2022-530422, mailed on Nov. 21, 2023 with English Translation.

* cited by examiner

FIG. 39

IMAGE FOR QUERY

| IMAGE IDENTIFICATION INFORMATION | KEYWORD |
|---|---|
| C0001 | SITTING, KNEELING IN FORMAL POSITION |
| C0002 | SITTING, SITTING CROSS-LEGGED |
| ... | ... |

FIG. 40

ANALYSIS TARGET IMAGE

| IMAGE IDENTIFICATION INFORMATION | KEYWORD | · · · |
|---|---|---|
| 000001 | SITTING, KNEELING IN FORMAL POSITION | · · · |
| 000002 | · · · | · · · |
| 000003 | · · · | · · · |
| 000004 | · · · | · · · |
| · · · | · · · | · · · |

IMAGE PROCESSING APPARATUS, IMAGE PROCESSING METHOD, AND NON-TRANSITORY STORAGE MEDIUM

This application is a National Stage Entry of PCT/JP2020/022815 filed on Jun. 10, 2020, the contents of all of which are incorporated herein by reference, in their entirety.

TECHNICAL FIELD

The present invention relates to an image processing apparatus, an image processing method, and a program.

BACKGROUND ART

In recent years, a technology for detecting and retrieving a state of a person, such as a pose and a behavior, from an image from a surveillance camera has been used in a surveillance system and the like. For example, Patent Documents 1 and 2 are known as related technologies. Patent Document 1 discloses a technology for retrieving a similar pose of a person, based on key joints such as the head and limbs of a person included in a depth image. While not being related to a pose of a person, Patent Document 2 discloses a technology for retrieving a similar image by using pose information added to an image, such as inclination. Note that, in addition, Non Patent Document 1 is known as a technology related to skeleton estimation of a person.

RELATED DOCUMENT

Patent Document

Patent Document 1: Japanese Translation of PCT International Application Publication No. 2014-522035
Patent Document 2: Japanese Patent Application Publication No. 2006-260405

Non Patent Document

Non Patent Document 1: Zhe Cao, Tomas Simon, Shih-En Wei, Yaser Sheikh, "Realtime Multi-Person 2D Pose Estimation using Part Affinity Fields," The IEEE Conference on Computer Vision and Pattern Recognition (CVPR), 2017, pp. 7291 to 7299

DISCLOSURE OF THE INVENTION

Technical Problem

For high-precision retrieval of an image including a person in a predetermined state, it is preferable to set an image well representing a state of a person and more specifically an image allowing accurate extraction of a feature part of the state of the person by computer processing to be a query image. However, it is not easy for a person to determine whether each query image satisfies the condition. Neither of the cited documents discloses the issue and a solution.

An object of the present invention is to enable high-precision retrieval of an image including a person in a predetermined state.

Solution to Problem

The present invention provides an image processing apparatus including:

an image acquisition unit that acquires a candidate of a query image;
a skeletal structure detection unit that detects a two-dimensional skeletal structure of a person included in a candidate of the query image;
a query evaluation unit that computes an evaluation value of a candidate of the query image, based on a detection result of the two-dimensional skeletal structure;
a selection unit that selects a query image out of one or a plurality of candidates of the query image, based on the evaluation value;
a feature value computation unit that computes a feature value of the two-dimensional skeletal structure detected from the query image; and
a retrieval unit that retrieves an analysis target image including a person in a pose similar to a pose of a person included in the query image out of one or a plurality of the analysis target images, based on a degree of similarity of the computed feature value.

Further, the present invention provides an image processing method including, by a computer:
acquiring a candidate of a query image;
detecting a two-dimensional skeletal structure of a person included in a candidate of the query image;
computing an evaluation value of a candidate of the query image, based on a detection result of the two-dimensional skeletal structure;
selecting a query image out of one or a plurality of candidates of the query image, based on the evaluation value;
computing a feature value of the two-dimensional skeletal structure detected from the query image; and
retrieving an analysis target image including a person in a pose similar to a pose of a person included in the query image out of one or a plurality of the analysis target images, based on a degree of similarity of the computed feature value.

Further, the present invention provides a program causing a computer to function as:
an image acquisition unit that acquires a candidate of a query image;
a skeletal structure detection unit that detects a two-dimensional skeletal structure of a person included in a candidate of the query image;
a query evaluation unit that computes an evaluation value of a candidate of the query image, based on a detection result of the two-dimensional skeletal structure;
a selection unit that selects a query image out of one or a plurality of candidates of the query image, based on the evaluation value;
a feature value computation unit that computes a feature value of the two-dimensional skeletal structure detected from the query image; and
a retrieval unit that retrieves an analysis target image including a person in a pose similar to a pose of a person included in the query image out of one or a plurality of the analysis target images, based on a degree of similarity of the computed feature value.

Advantageous Effects of Invention

The present invention enables high-precision retrieval of an image including a person in a predetermined state.

BRIEF DESCRIPTION OF THE DRAWINGS

FIG. 39 is a diagram schematically illustrating an example of information processed by the image processing apparatus.

FIG. 40 is a diagram schematically illustrating an example of information processed by the image processing apparatus.

DESCRIPTION OF EMBODIMENTS

Example embodiments of the present invention will be described below by using drawings. Note that, in every drawing, similar components are given similar signs, and description thereof is omitted as appropriate.

Examination Leading to Example Embodiments

In recent years, an image recognition technology utilizing machine learning such as deep learning has been applied to various systems. For example, application to a surveillance system performing surveillance with an image from a surveillance camera is under way. Utilization of machine learning in a surveillance system has enabled a certain degree of recognition of a state of a person, such as a pose and a behavior, from an image.

However, such a related technology may not necessarily be able to recognize a state of a person desired by a user on demand. For example, a user may be able to previously determine a state of a person which the user desires to retrieve and recognize or may not be able to specifically determine the state as is the case with an unknown state. Then, in some cases, the user cannot specify a state of a person to be retrieved in detail. Further, when a part of the body of a person is hidden, retrieval and the like cannot be performed. A state of a person can be retrieved only under a specific search condition in the related technologies, and therefore it is difficult to flexibly retrieve or classify a state of a desired person.

The inventors have examined a method using a skeleton estimation technology such as Non Patent Document 1 for on-demand recognition of a state of a person desired by a user from an image. In a related skeleton estimation technology such as OpenPose disclosed in Non Patent Document 1, a skeleton of a person is estimated by learning of image data annotated in various patterns. The following example embodiments enable flexible recognition of a state of a person by utilizing such a skeleton estimation technology.

Note that a skeletal structure estimated by a skeleton estimation technology such as OpenPose is constituted of a "keypoint" being a characteristic point such as a joint, and a "bone (bone link)" indicating a link between keypoints. Therefore, while a skeletal structure is described by using terms "keypoint" and "bone" in the following example embodiments, a "keypoint" is related to a "joint" of a person, and a "bone" is related to a "bone" of a person unless otherwise defined.

Overview of Example Embodiment

Figure 1:
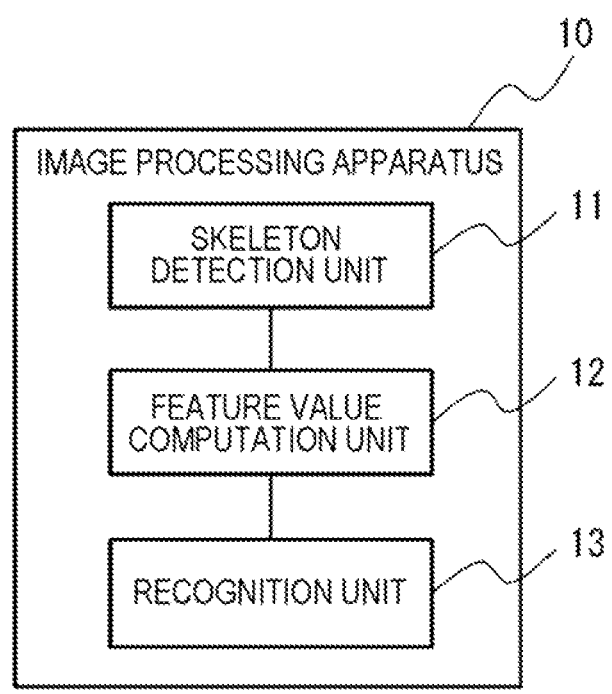
FIG. 1 is a configuration diagram illustrating an overview of an image processing apparatus according to an example embodiment.

FIG. 1 illustrates an overview of an image processing apparatus 10 according to an example embodiment. As illustrated in FIG. 1, the image processing apparatus 10 includes a skeleton detection unit 11, a feature value computation unit 12, and a recognition unit 13. The skeleton detection unit 11 detects two-dimensional skeletal structures (hereinafter may be simply referred to as "skeletal structures") of a plurality of persons, based on a two-dimensional image acquired from a camera or the like. The feature value computation unit 12 computes feature values of a plurality of two-dimensional skeletal structures detected by the skeleton detection unit 11. The recognition unit 13 performs recognition processing of states of a plurality of persons, based on a degree of similarity between a plurality of feature values computed by the feature value computation unit 12. The recognition processing includes classification processing and retrieval processing of a state of a person.

Thus, according to the example embodiment, a two-dimensional skeletal structure of a person is detected from a two-dimensional image, and recognition processing such as classification and retrieval of a state of the person is performed based on a feature value computed from the two-dimensional skeletal structure.

Example Embodiment 1

Figure 2:
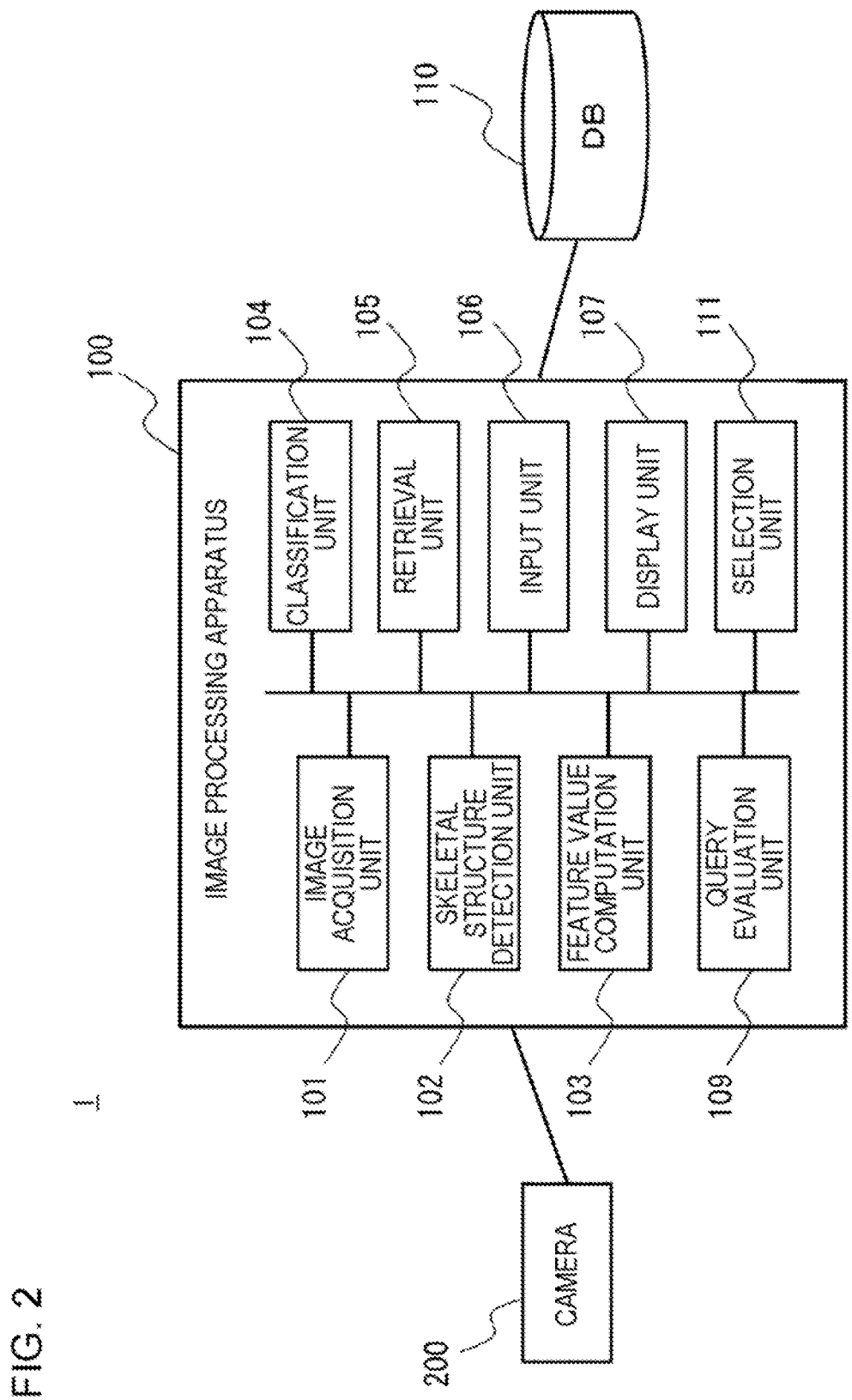
FIG. 2 is a configuration diagram illustrating a configuration of an image processing apparatus according to an example embodiment 1.

An example embodiment 1 will be described below with reference to drawings. FIG. 2 illustrates a configuration of an image processing apparatus 100 according to the present example embodiment. The image processing apparatus 100 constitutes an image processing system 1 along with a camera 200 and a storage means [database (DB) 110]. The image processing system 1 including the image processing apparatus 100 is a system classifying and retrieving a state of a person, such as a pose and a behavior, based on a skeletal structure of the person estimated from an image.

The camera 200 is an image capture unit, such as a surveillance camera, generating a two-dimensional image. The camera 200 is installed at a predetermined location and captures an image of a person and the like in an image capture region from the installation location. The camera 200 is directly connected in a wired or wireless manner to the image processing apparatus 100 in such a way as to be able to output a captured image (video) to the image processing apparatus 100 or is connected through any communication network or the like. Note that the camera 200 may be provided inside the image processing apparatus 100.

The database 110 is a database storing information (data) required for processing by the image processing apparatus 100, a processing result, and the like. The database 110 stores an image acquired by an image acquisition unit 101, a detection result by a skeletal structure detection unit 102, data for machine learning, a feature value computed by a feature value computation unit 103, a classification result by a classification unit 104, a retrieval result by a retrieval unit 105, and the like. The database 110 is directly connected in a wired or wireless manner to the image processing apparatus 100 in such a way as to be able to input and output data from and to the image processing apparatus 100 as needed or is connected through any communication network or the like. Note that the database 110 may be provided inside the image processing apparatus 100 as a nonvolatile memory such as a flash memory, a hard disk apparatus, or the like.

As illustrated in FIG. 2, the image processing apparatus 100 includes the image acquisition unit 101, the skeletal structure detection unit 102, the feature value computation unit 103, the classification unit 104, the retrieval unit 105, an input unit 106, a display unit 107, a query evaluation unit 109, and a selection unit 111. Note that a configuration of the units (blocks) is an example, and a configuration with other units may be employed as long as the configuration enables a method (operation) to be described later. Further, for example, while the image processing apparatus 100 is provided by a computer apparatus executing a program, such as a personal computer or a server, the image processing apparatus 100 may be provided by a single apparatus or may be provided by a plurality of apparatuses on a network. For example, the input unit 106, the display unit 107, and the like may be external apparatuses. Further, both of the classification unit 104 and the retrieval unit 105 may be included, or only either one may be included. Both of the classification unit 104 and the retrieval unit 105 or either one constitutes the recognition unit 13 performing recognition processing of a state of a person. Further, the query evaluation unit 109 and the selection unit 111 are functional units executing the retrieval processing along with the retrieval unit 105 and correspond to the recognition unit 13 in FIG. 1.

The image processing apparatus 100 executes data accumulation processing, the classification processing, and the retrieval processing in this order. Note that, as will be described below, the image processing apparatus 100 may not execute the classification processing.

Data Accumulation Processing

The data accumulation processing is processing of acquiring an image of an analysis target (hereinafter "analysis target image"), detecting a two-dimensional skeletal structure of a person from each of a plurality of analysis target images, computing a feature value of the detected two-dimensional skeletal structure, and storing the computed feature value into the database 110 in association with each analysis target image. A configuration of functional units related to the data accumulation processing will be described below.

The image acquisition unit 101 acquires an analysis target image. "Acquisition" herein includes at least one item out of "an apparatus getting data stored in another apparatus or a storage medium (active acquisition)" such as making a request or an inquiry to another apparatus and receiving a response or readout by accessing another apparatus or a storage medium, based on a user input or a program instruction, and "an apparatus inputting data output from another apparatus to the apparatus (passive acquisition)" such as reception of distributed (or, for example, transmitted or push notified) data or acquisition by selection from received data or information, based on a user input or a program instruction, and "generating new data by data editing (such as conversion to text, data rearrangement, partial data extraction, or file format change) and acquiring the new data."

For example, the image acquisition unit 101 acquires, as an analysis target image, a two-dimensional image including a person an image of whom is captured by the camera 200 in a predetermined surveillance period. In addition, the image acquisition unit 101 may acquire, as an analysis target image, a two-dimensional image including a person stored in a storage means such as the database 110.

The skeletal structure detection unit 102 detects a two-dimensional skeletal structure of a person from each acquired analysis target image. The skeletal structure detection unit 102 can detect a skeletal structure for every person recognized in the analysis target image. By using a skeleton estimation technology using machine learning, the skeletal structure detection unit 102 detects a skeletal structure of a recognized person, based on a feature of the person such as a joint. For example, by using a skeleton estimation technology such as OpenPose in Non Patent Document 1, the skeletal structure detection unit 102 extracts a keypoint being a characteristic point such as a joint.

The feature value computation unit 103 computes a feature value of a detected two-dimensional skeletal structure and stores the computed feature value into the database 110 in association with an analysis target image from which the two-dimensional skeletal structure is detected. A feature value of a skeletal structure indicates a feature of a skeleton of a person and is an element for classifying and retrieving a state of the person, based on the skeleton of the person. Normally, the feature value includes a plurality of parameters (such as a classification element to be described later). The feature value may be a feature value of an entire skeletal structure, may be a feature value of part of the skeletal structure, or may include a plurality of feature values such as parts of the skeletal structure. A method for computing a feature value may be any method such as machine learning or normalization, and a minimum value or a maximum value may be found as normalization. Examples of a feature value include a feature value acquired by performing machine learning on a skeletal structure and the size of the skeletal structure from the head to the foot in an image. Examples of the size of a skeletal structure include the height and the area of a skeleton region including a skeletal structure in an image in a vertical direction. The vertical direction (a height direction or a longitudinal direction) is a vertical direction in an image (Y-axis direction) and is, for example, a direction perpendicular to the ground (reference plane). Further, a horizontal direction (lateral direction) is a horizontal direction in the image (X-axis direction) and is, for example, a direction parallel to the ground.

Note that in order for a user to perform desired classification and retrieval, it is preferable to use a feature value with robustness to classification and retrieval processing. For example, when a user desires classification and retrieval independent of the orientation and the body shape of a person, a feature value robust to the orientation and the body shape of a person may be used. A feature value independent of the orientation and the body shape of a person can be acquired by performing learning on a skeleton of a person facing in various directions in the same pose and skeletons of persons with various body shapes in the same pose, and extraction of a feature of a skeleton in only the vertical direction.

Classification Processing

The classification processing is processing of, based on data stored in the database 110 in the data accumulation processing (data associating an analysis target image with a feature value of a two-dimensional skeletal structure detected from the analysis target image), putting together and classifying (grouping) a plurality of two-dimensional skeletal structures having similar feature values and being detected from the analysis target image. Note that an analysis target image and a two-dimensional skeletal structure detected from the analysis target image are associated with each other. Therefore, classification of a plurality of two-dimensional skeletal structures by the classification processing is also classification of a plurality of analysis target images. The plurality of analysis target images including similar two-dimensional skeletal structures are put together by the classification processing. A configuration of functional units related to the classification processing will be described below.

The classification unit 104 classifies (performs clustering on) a plurality of skeletal structures stored in the database 110, based on a degree of similarity between feature values of skeletal structures. The classification unit 104 may be considered to classify states of a plurality of persons, based on feature values of skeletal structures, as recognition processing of a state of a person. A degree of similarity is the distance between feature values of skeletal structures. The classification unit 104 may perform classification, based on a degree of similarity between feature values of entire skeletal structures, may perform classification, based on a degree of similarity between feature values of partial skeletal structures, or may perform classification, based on a degree of similarity between feature values of first parts (such as both hands) and second parts (such as both feet) of skeletal structures. Note that poses of persons may be classified based on feature values of skeletal structures of persons in each image, or behaviors of persons may be classified based on a change in a feature value of a skeletal structure of a person in a plurality of chronologically continuous images. In other words, the classification unit 104 can classify states of persons including poses and behaviors of the persons, based on feature values of skeletal structures. For example, the classification unit 104 sets a plurality of skeletal structures in a plurality of images captured in a predetermined surveillance period to be classification targets. The classification unit 104 finds a degree of similarity between feature values of classification targets and performs classification in such a way that skeletal structures with a high degree of similarity are included in the same cluster (a group of similar poses). Note that a classification condition may be specified by a user, similarly to retrieval. The classification unit 104 can store the classification result of the skeletal structures into the database 110 and can also display the result on the display unit 107.

Retrieval Processing

The retrieval processing is processing of, based on data stored in the database 110 (data associating an analysis target image with a feature value of a two-dimensional skeletal structure detected from the analysis target image) in the data accumulation processing, retrieving a predetermined skeletal structure out of a plurality of two-dimensional skeletal structures detected from analysis target images. Note that an analysis target image and a two-dimensional skeletal structure detected from the analysis target image are associated with each other. Therefore, an analysis target image including a predetermined skeletal structure can be retrieved by the "processing of retrieving a predetermined skeletal structure out of a plurality of two-dimensional skeletal structures detected from analysis target images."

When acquiring candidates of one or a plurality of query images, the image processing apparatus 100 computes an evaluation value of each candidate in the retrieval processing according to the present example embodiment. The evaluation value is an indicator of whether an image well allows extraction of a feature part of a state of a person by computer processing. Then, based on such an evaluation value, the image processing apparatus 100 selects a query image out of the candidates of query images and performs retrieval, based on the selected query image. Such an image processing apparatus 100 enables selection of an image preferable for retrieval as a query image. Then, high-precision retrieval of an image including a person in a predetermined state is enabled. A configuration of functional units related to the retrieval processing will be described below.

The image acquisition unit 101 acquires a candidate of a query image. For example, the image acquisition unit 101 can acquire a candidate of a query image by either of the following acquisition examples.

Acquisition Example 1

In the example, the image acquisition unit 101 acquires one of analysis target images as a candidate of a query image. For example, the image acquisition unit 101 may select a predetermined number of analysis target images in accordance with a predetermined rule from each of a plurality of groups generated in the aforementioned classification processing and set the selected analysis target images to be candidates of a query image.

Acquisition Example 2

In the example, the image acquisition unit 101 acquires an image being prepared and being input to the image processing apparatus 100 by a user as a candidate of a query image.

Acquisition Example 3

In the example, the image acquisition unit 101 acquires an image retrieved with a keyword specified by a user as a candidate of a query image. A content of a keyword is assumed to be related to a state (such as a pose or a behavior) of a person such as "sitting" and "standing.". For example, input of a keyword can be provided by using a known GUI such as a text box, a drop-down menu, or a checkbox.

For example, information associating an image prepared for use as a query image (hereinafter "an image for query") with a keyword (a word indicating a state of a person included in each image) may be previously registered in the database 110, as illustrated in FIG. 39. Then, the image acquisition unit 101 may retrieve images for query associated with an input keyword from the information and acquire part or all of the images for query included in the retrieval result as candidates of a query image.

In addition, information associating part of analysis target images with a keyword (a word indicating a state of a person included in each image) may be registered in the database 110, as illustrated in FIG. 40. Then, the image acquisition unit 101 may retrieve analysis target images associated with an input keyword from the information and acquire part or all of the analysis target images included in the retrieval result as candidates of a query image.

In addition, the image acquisition unit 101 may transmit an input keyword to a search engine for retrieving an image related to the keyword and acquire the retrieval result from the search engine. Then, the image acquisition unit 101 may acquire part or all of images included in the retrieval result as candidates of a query image.

The skeletal structure detection unit 102 detects a two-dimensional skeletal structure of a person included in a candidate of a query image. The detection processing by the skeletal structure detection unit 102 is as described in the data accumulation processing.

Based on a detection result of a two-dimensional skeletal structure by the skeletal structure detection unit 102, the query evaluation unit 109 computes an evaluation value of a candidate of a query image. The query evaluation unit 109 can compute an evaluation value, based on at least one of the number of extracted keypoints and a confidence level of each extracted keypoint (a confidence level of an extraction result). Further, the query evaluation unit 109 can compute an evaluation value, based on the size of a person in an image.

While a detailed algorithm of the evaluation value computation is not particularly defined, the algorithm is designed in such a way as to satisfy the following descriptions.

An evaluation value increases as the number of extracted keypoints increases.

An evaluation value increases as the confidence level of an extracted keypoint increases.

An evaluation value increases as the size of a person in an image increases.

Note that the query evaluation unit 109 may compute an evaluation value, based on a weight value of each of a plurality of keypoints set based on a user input. In this case, the algorithm of the evaluation value computation is designed in such a way as to further satisfy the following descriptions in addition to the aforementioned descriptions.

An evaluation value increases as a weight value of an extracted keypoint increases.

A keypoint with a higher weight value is extracted, and an evaluation value increases as the confidence level of the keypoint increases.

An example of processing of setting a weight value of each of a plurality of keypoints, based on a user input, will be described.

First, the image processing apparatus 100 determines part of a plurality of keypoints, based on one of the following three types of processing.

Accepting a user input for enclosing part of the body of a person with a frame in an image indicating the body and determining a keypoint included in the frame.

Accepting a user input for specifying, in an image indicating the body of a person and keypoints of the body (an image in which a plurality of keypoints are superimposed on the body of a person), part of the keypoints and determining the specified keypoint.

Accepting a user input for specifying part of the body of a person by the name of the part (such as the right arm, the right foot, the lower half of the body, or the upper half of the body) and determining a keypoint included in the specified part.

Then, the image processing apparatus 100 sets a weight value of the determined keypoint, based on a user input.

Based on an evaluation value of a candidate of each query image, the value being computed by the query evaluation unit 109, the selection unit 111 selects a query image from candidates of the query image. Examples of the selection will be described below.

Selection Example 1

Figure 41:
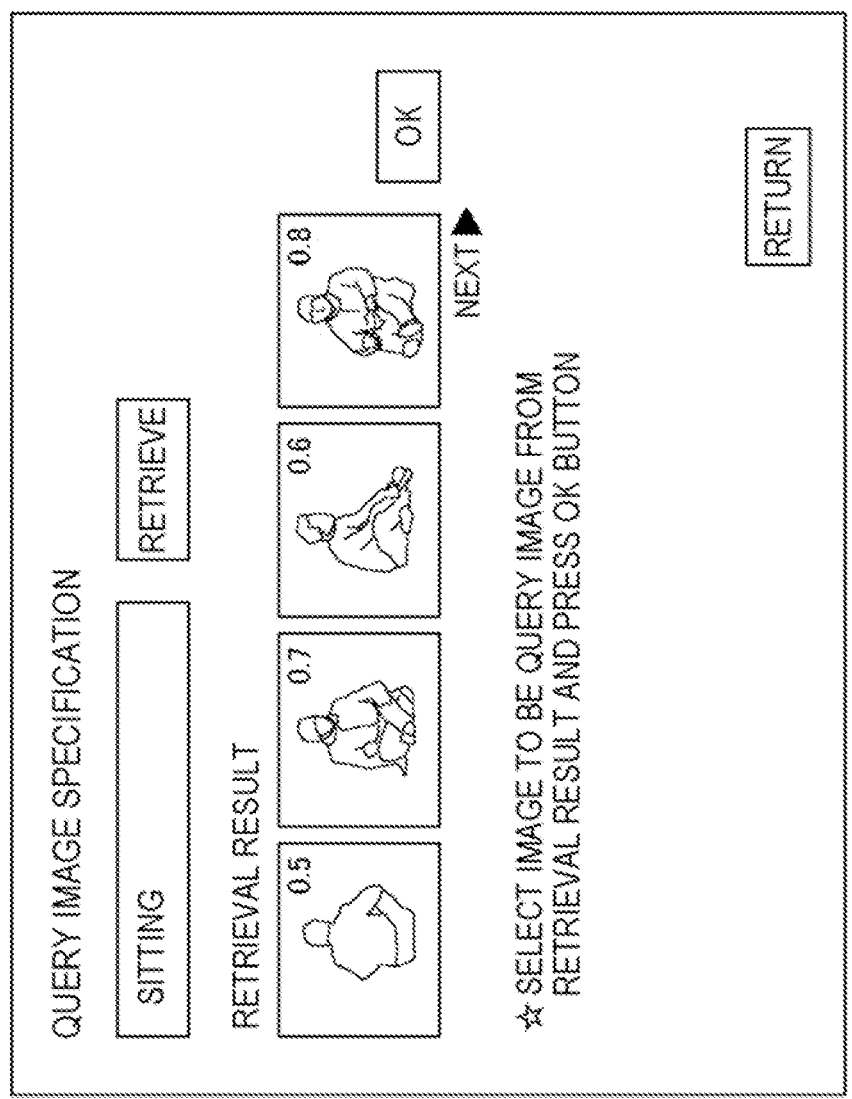
FIG. 41 is a diagram schematically illustrating an example of a screen output by the image processing apparatus.
Figure 42:
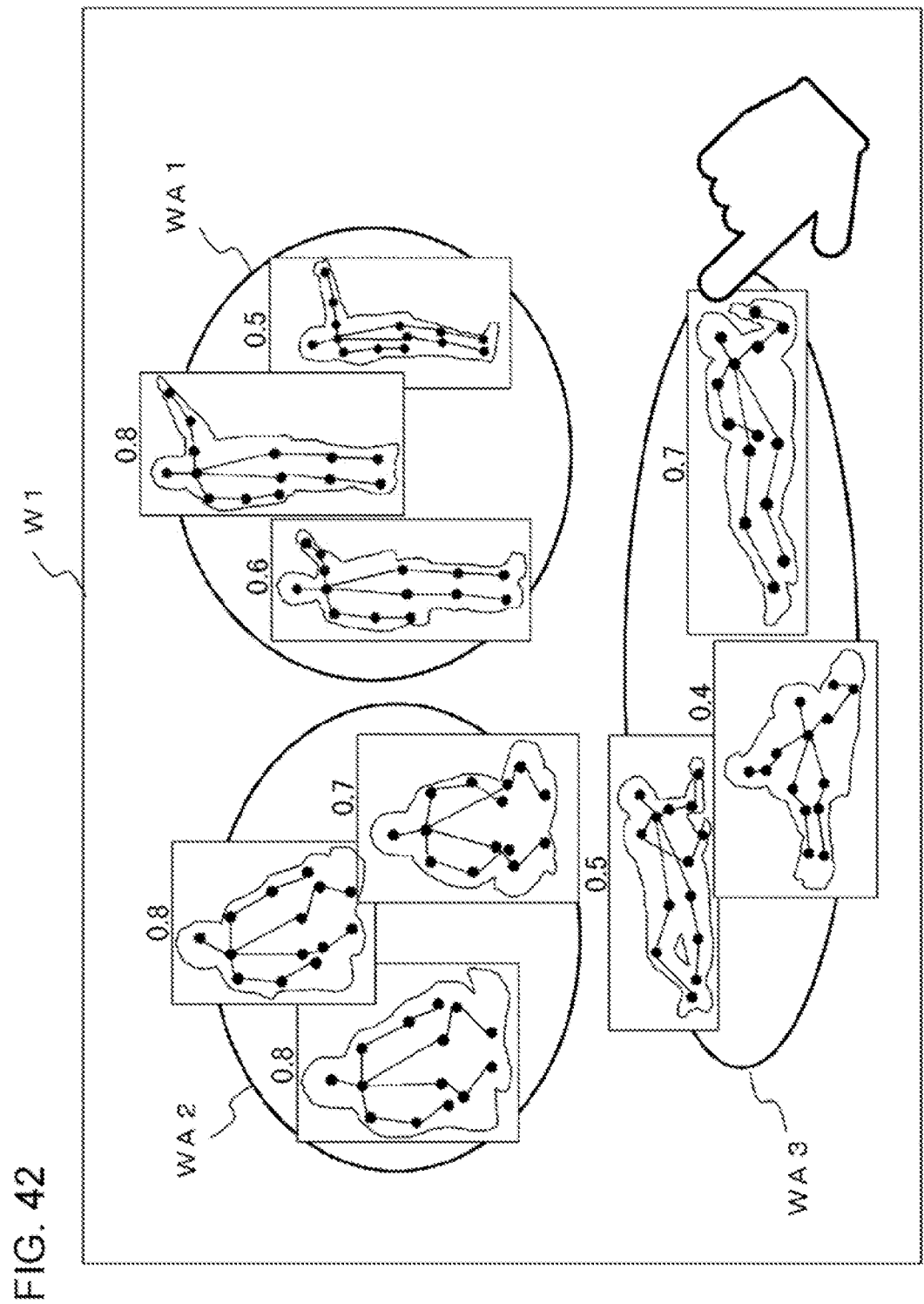
FIG. 42 is a diagram schematically illustrating an example of a screen output by the image processing apparatus.

In the example, as illustrated in FIG. 41 and FIG. 42, the selection unit 111 outputs evaluation values of candidates of a plurality of query images (numerical values respectively displayed under images in the diagrams) in such a way that the values are comparable with each other and accepts a user input for specifying one or a plurality of query images from the candidates of the plurality of query images. Then, the selection unit 111 selects candidates of the one or the plurality of query images specified by the user input as query images. Note that while evaluation values of candidates of a plurality of query images are comparable by being displayed in list form in the examples in FIG. 41 and FIG. 42, the values may be comparable by sequentially changing candidates of query images displayed on a screen. Then, the selection unit 111 may display the candidates of query images in descending order of evaluation value. For example, the selection unit 111 may arrange evaluation values in descending order and display candidates of query images and the evaluation values thereof in list form. Further, the selection unit 111 may sequentially display candidates of query images and the evaluation values thereof in descending order of evaluation value. Note that while evaluation values of candidates of a plurality of query images are displayed in the examples illustrated in FIG. 41 and FIG. 42, when the image acquisition unit 101 acquires candidates of a single query image, the evaluation values of the candidates of the single query image is displayed.

FIG. 41 is an example of retrieving candidates of a query image with a keyword described above, and images hit by the keyword (candidates of a query image) and evaluation values thereof (numerical values respectively associated with the images) are displayed as a retrieval result.

FIG. 42 is an example of acquiring part of analysis target images as candidates of query images. A predetermined number of analysis target images selected in accordance with a predetermined rule from each of a plurality of groups generated in the aforementioned classification processing are displayed as candidates of query images. The candidates of the plurality of query images are collectively displayed for each group. Then, an evaluation value of each of the candidates of the plurality of query images (a numerical value associated with each image) is displayed.

Note that extracted keypoints may be displayed, as illustrated in FIG. 42, or extracted keypoints may not be displayed, as illustrated in FIG. 41.

Selection Example 2

The selection unit 111 selects, as a query image, a candidate of the query image the evaluation value of which satisfies a criterion (being a reference value or greater). In this example, the image processing apparatus 100 automatically selects a query image out of candidates of the query image, and therefore a selection operation by a user is unnecessary.

The feature value computation unit 103 computes a feature value of a two-dimensional skeletal structure detected from a query image selected by the selection unit 111. The extraction processing by the feature value computation unit 103 is as described in the data accumulation processing.

Out of a plurality of skeletal structures stored into the database 110 in the data accumulation processing, the retrieval unit 105 retrieves a skeletal structure with a high degree of similarity with a feature value of a search query (query state) (a feature value of a two-dimensional skeletal structure detected from a query image).

For example, the retrieval unit 105 may retrieve a skeletal structure with a high degree of similarity with a feature value of a search query by checking the feature value of the search query against a feature value of a skeletal structure detected from each of a plurality of analysis target images. In this configuration, the aforementioned classification processing is unnecessary. However, checking targets become all of the plurality of analysis target images, and therefore a processing load on a computer in the checking becomes significant.

Then, the retrieval unit 105 may determine a representative of a feature value of a two-dimensional skeletal structure by any means for each group acquired in the classification processing and retrieve a skeletal structure with a high degree of similarity with a feature value of the aforementioned search query by checking the representative against the feature value of the search query. In this configuration, the number of checking targets decreases, and therefore a processing load on the computer in the checking is reduced.

Note that an analysis target image and a two-dimensional skeletal structure detected from the analysis target image are associated with each other. Therefore, by the aforementioned "processing of retrieving a predetermined skeletal structure out of a plurality of two-dimensional skeletal structures detected from an analysis target image," an analysis target image including the predetermined skeletal structure (a skeletal structure with a high degree of similarity with a feature value of a search query) can be retrieved. In other words, an analysis target image including a person in a state similar to the state of a person included in the query image can be retrieved out of analysis target images.

A degree of similarity is the distance between feature values of skeletal structures. The retrieval unit 105 may perform retrieval, based on a degree of similarity between feature values of entire skeletal structures, may perform retrieval, based on a degree of similarity between feature values of partial skeletal structures, or may perform retrieval, based on a degree of similarity between feature values of first parts (such as both hands) and second parts (such as both feet) of skeletal structures. Note that the retrieval unit 105 may retrieve a pose of a person, based on a feature value of a skeletal structure of the person in each image or may retrieve a behavior of a person, based on a change in a feature value of a skeletal structure of the person in a plurality of chronologically continuous images. In other words, the retrieval unit 105 can retrieve a state of a person including a pose and a behavior of the person, based on a feature value of a skeletal structure. For example, the retrieval unit 105 sets feature values of a plurality of skeletal structures in a plurality of analysis target images captured in a predetermined surveillance period to be search targets.

The input unit 106 is an input interface acquiring information input by a user operating the image processing apparatus 100. For example, a user is a surveillant surveilling a person in a suspicious state from an image from a surveillance camera. For example, the input unit 106 is a graphical user interface (GUI), and information based on a user operation is input from an input apparatus such as a keyboard, a mouse, a touch panel, a microphone, or a physical button.

The display unit 107 is a display unit displaying an operation (processing) result of the image processing apparatus 100 and the like, examples of the unit including display apparatuses such as a liquid crystal display and an organic electro luminescence (EL) display. The display unit 107 displays a classification result by the classification unit 104, a retrieval result by the retrieval unit 105, an evaluation value of a candidate of a query image described above, and the like.

Next, an example of a hardware configuration of the image processing apparatus 100 will be described. Each functional unit in the image processing apparatus 100 is provided by any combination of hardware and software centered on a central processing unit (CPU), a memory, a program loaded into the memory, a storage unit storing the program, such as a hard disk [capable of storing not only a program previously stored in the shipping stage of the apparatus but also a program downloaded from a storage medium such as a compact disc (CD) or a server on the Internet], and a network connection interface in any computer. Then, it should be understood by a person skilled in the art that various modifications to the providing method and the apparatus can be made.

Figure 43:
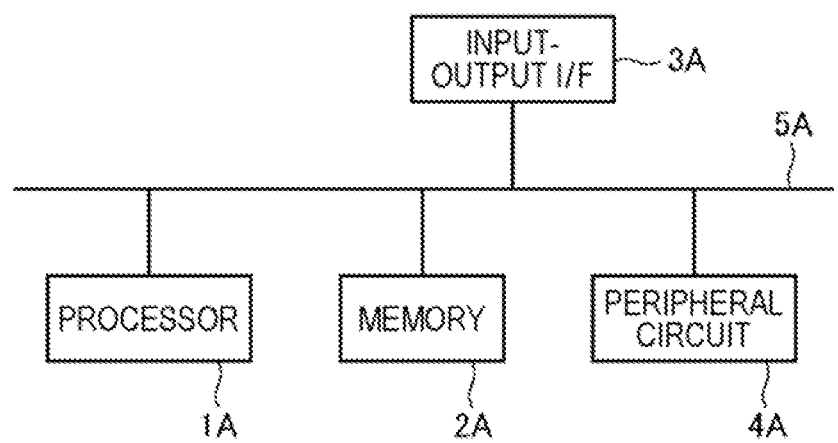
FIG. 43 is a diagram illustrating a hardware configuration of the image processing apparatus.

FIG. 43 is a block diagram illustrating a hardware configuration of the image processing apparatus 100. As illustrated in FIG. 43, the image processing apparatus 100 includes a processor 1A, a memory 2A, an input-output interface 3A, a peripheral circuit 4A, and a bus 5A. The peripheral circuit 4A includes various modules. The image processing apparatus 100 may not include the peripheral circuit 4A. Note that the image processing apparatus 100 may be configured with a plurality of physically and/or logically separate apparatuses or may be configured with one physically and/or logically integrated apparatus. When the image processing apparatus 100 is configured with a plurality of physically and/or logically separate apparatuses, each of the plurality of apparatuses may include the aforementioned hardware configuration.

The bus 5A is a data transmission channel for the processor 1A, the memory 2A, the peripheral circuit 4A, and the input-output interface 3A to transmit and receive data to and from one another. Examples of the processor 1A include an arithmetic processing unit such as a CPU and a graphics processing unit (GPU). Examples of the memory 2A include memories such as a random access memory (RAM) and a read only memory (ROM). The input-output interface 3A includes an interface for acquiring information from an input apparatus, an external apparatus, an external server, an external sensor, a camera, and the like, and an interface for outputting information to an output apparatus, the external apparatus, the external server, and the like. Examples of the input apparatus include a keyboard, a mouse, a microphone, a physical button, and a touch panel. Examples of the output apparatus include a display, a speaker, a printer, and a mailer. The processor 1A issues an instruction to each module and can perform an operation, based on the operation result by the module.

Figure 3:
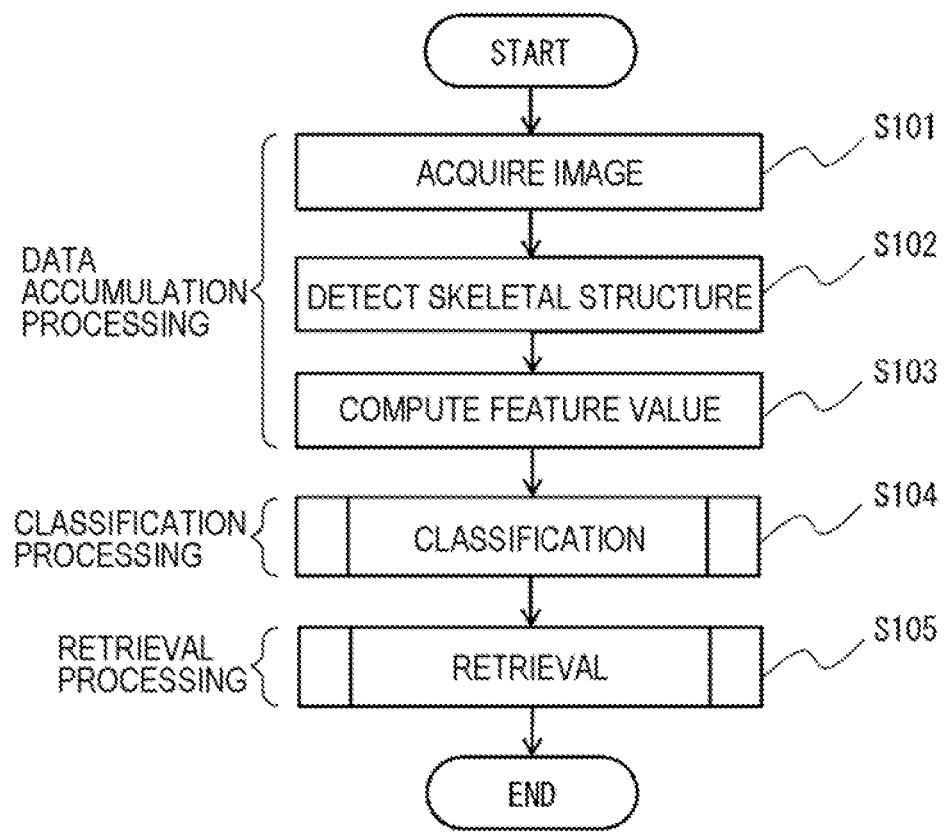
FIG. 3 is a flowchart illustrating an image processing method according to the example embodiment 1.
Figure 4:
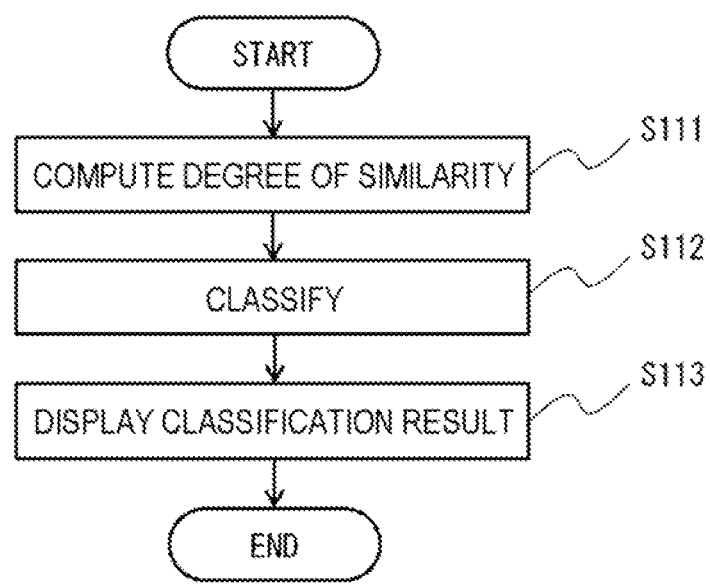
FIG. 4 is a flowchart illustrating a classification method according to the example embodiment 1.
Figure 5:
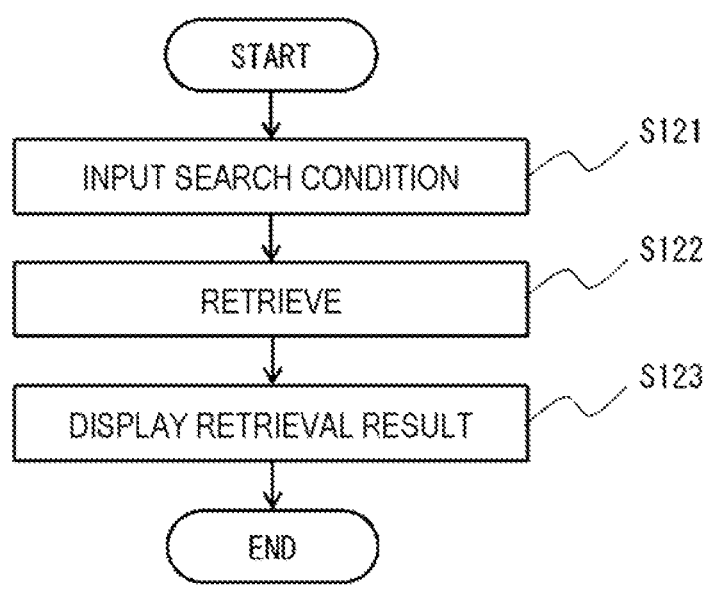
FIG. 5 is a flowchart illustrating a retrieval method according to the example embodiment 1.
Figure 44:
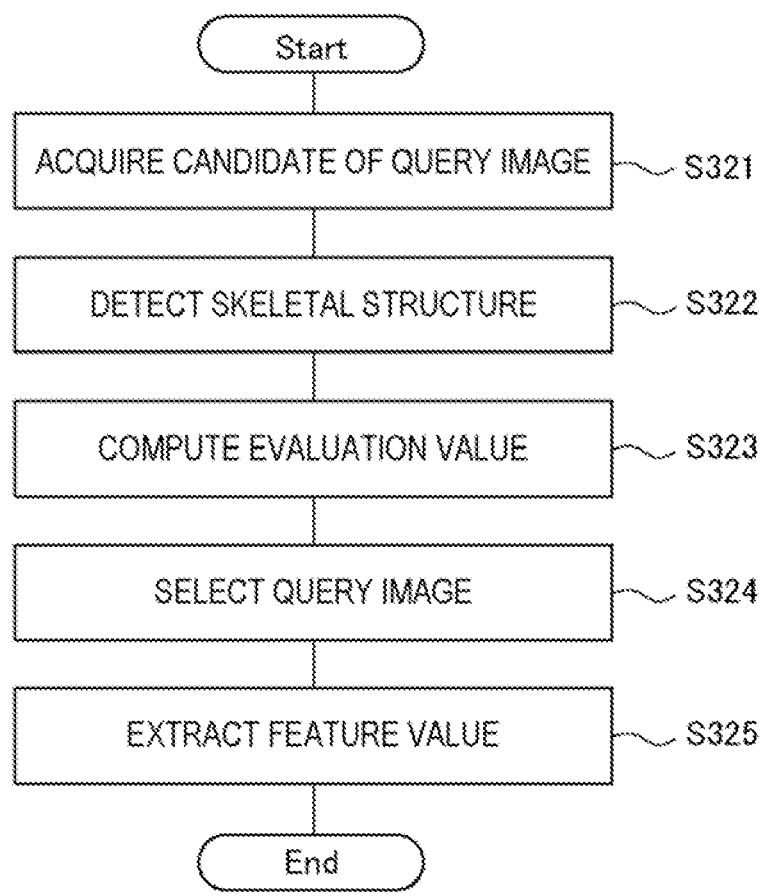
FIG. 44 is a flowchart illustrating an example of a flow of processing in the image processing apparatus.

FIG. 3 to FIG. 5 and FIG. 44 illustrate flows of processing in the image processing apparatus 100 according to the present example embodiment. FIG. 3 illustrates a flow from image acquisition to the retrieval processing in the image processing apparatus 100, FIG. 4 illustrates a flow in the classification processing (S104) in FIG. 3, and FIG. 5 and FIG. 44 illustrate flows in the retrieval processing (S105) in FIG. 3.

Figure 6:
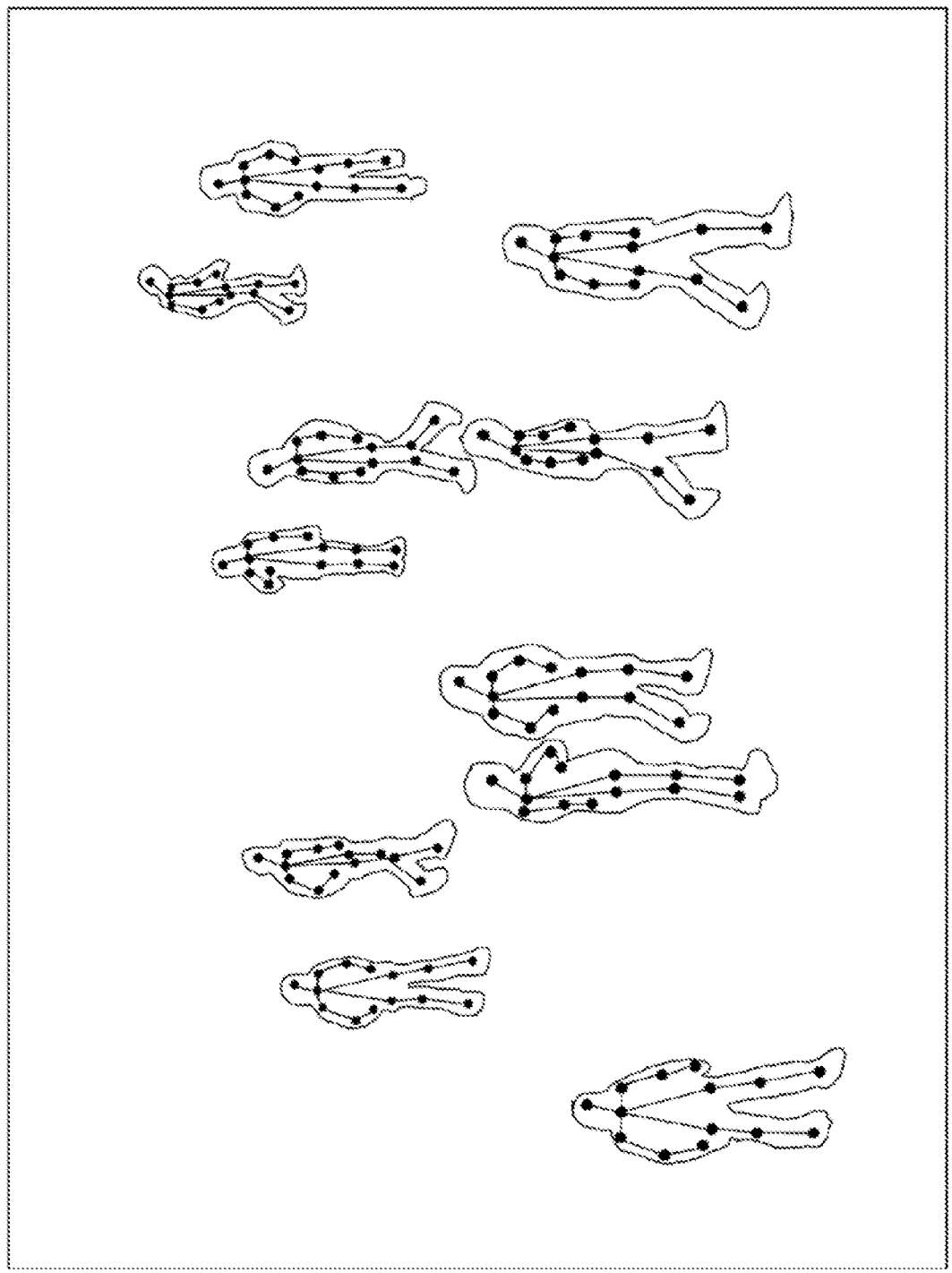
FIG. 6 is a diagram illustrating a detection example of a skeletal structure according to the example embodiment 1.

As described in FIG. 3, the image acquisition unit 101 acquires a plurality of analysis target images (S101). Next, the skeletal structure detection unit 102 detects a two-dimensional skeletal structure of a person from each of the plurality of acquired analysis target images (S102). FIG. 6 illustrates a detection example of a skeletal structure. As illustrated in FIG. 6, an analysis target image may include a plurality of persons. In this case, the skeletal structure detection unit 102 detects a skeletal structure for each person included in the analysis target image.

Figure 7:
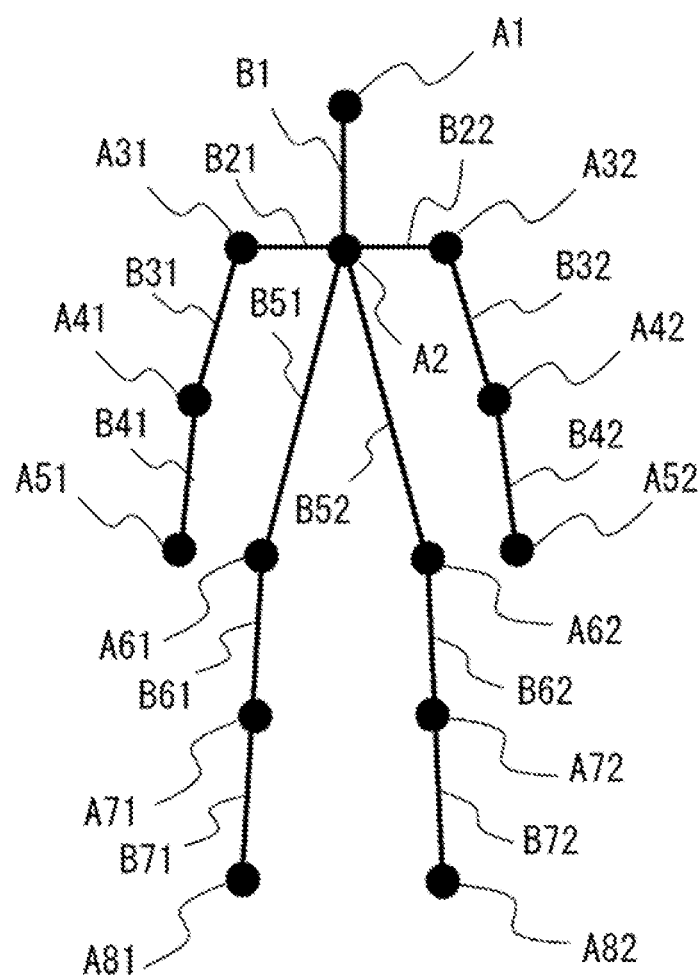
FIG. 7 is a diagram illustrating a human-body model according to the example embodiment 1.
Figure 8:
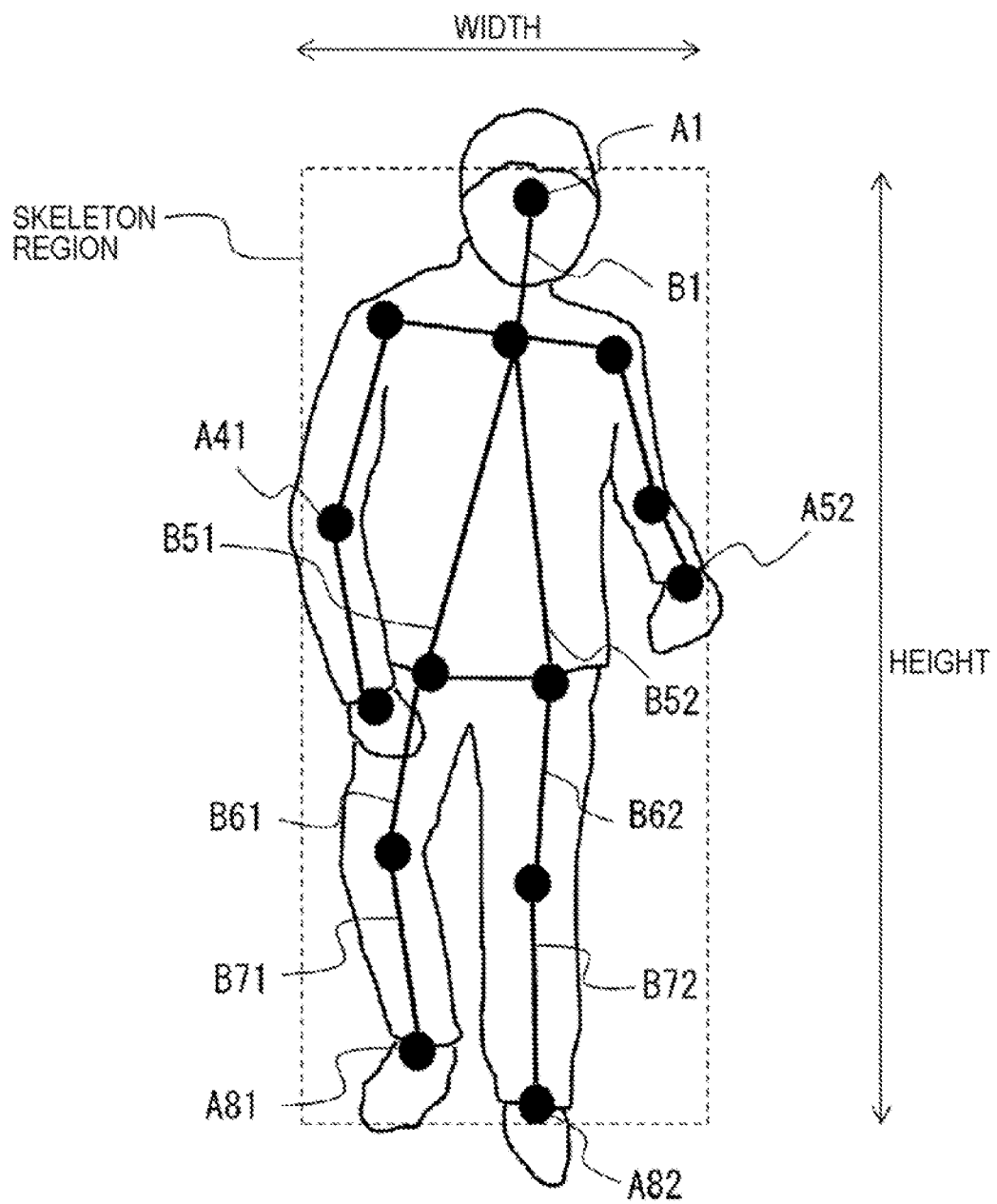
FIG. 8 is a diagram illustrating a detection example of a skeletal structure according to the example embodiment 1.
Figure 9:
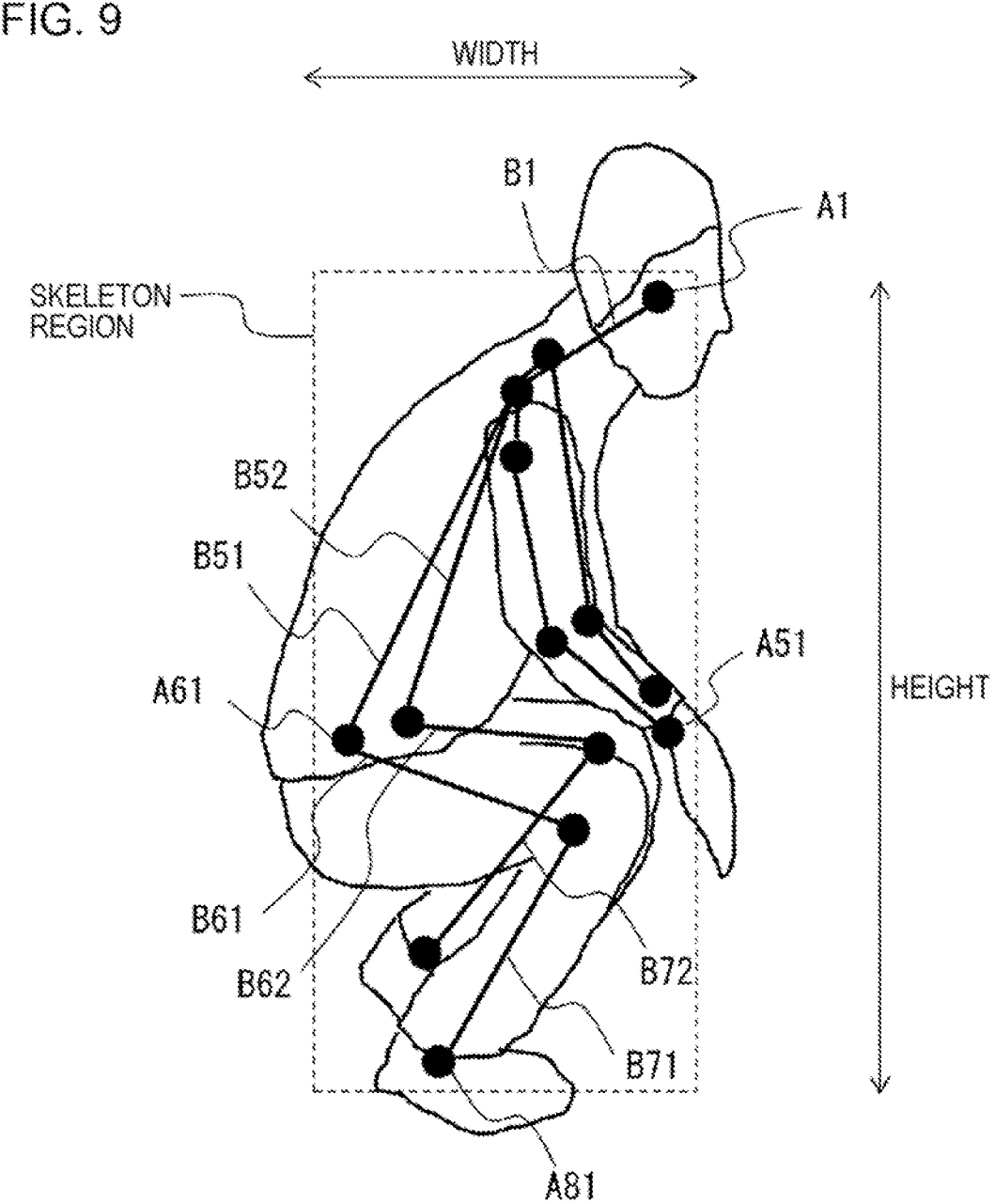
FIG. 9 is a diagram illustrating a detection example of a skeletal structure according to the example embodiment 1.
Figure 10:
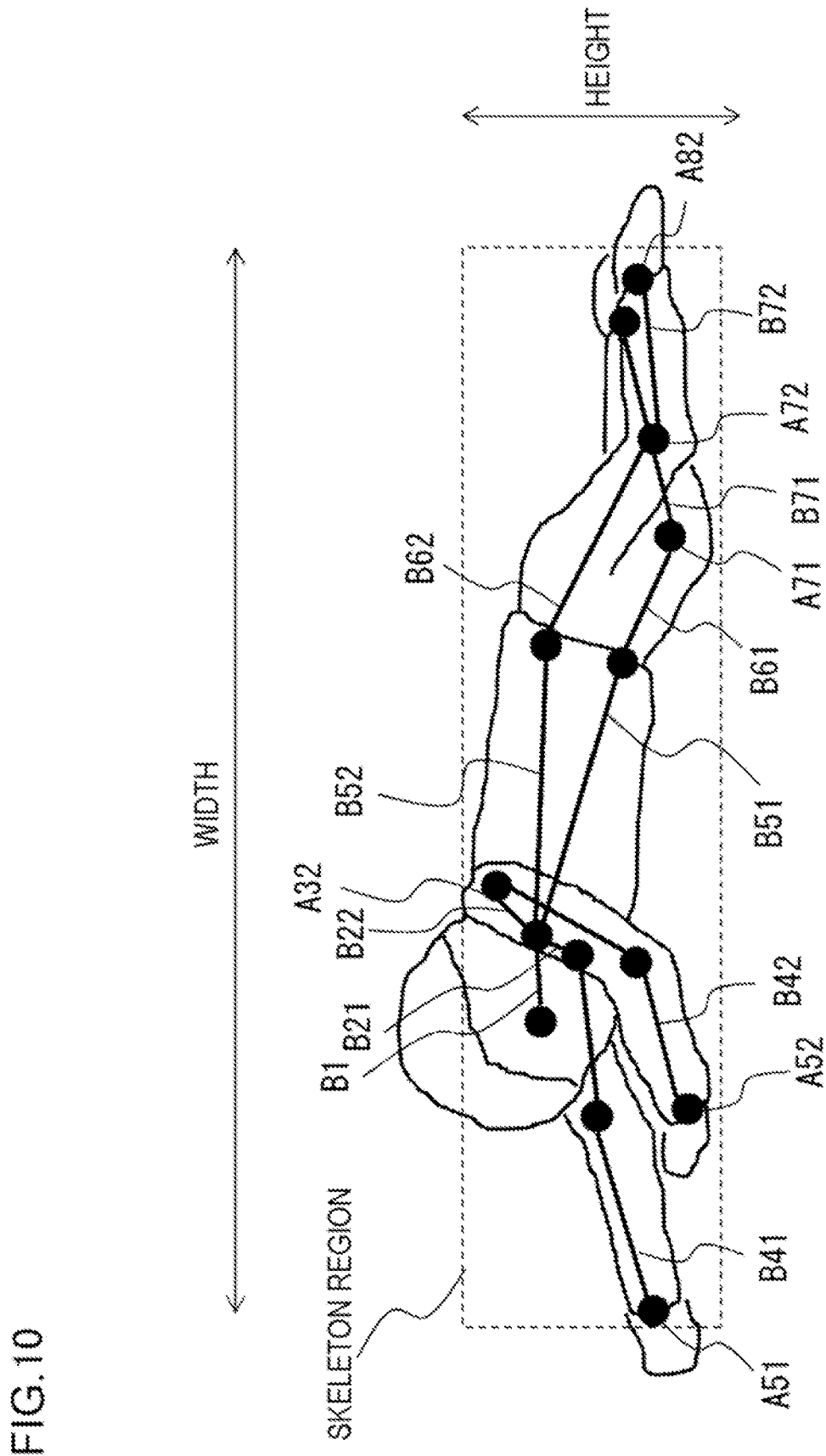
FIG. 10 is a diagram illustrating a detection example of a skeletal structure according to the example embodiment 1.

FIG. 7 illustrates a skeletal structure of a human-body model 300 detected at this time, and FIG. 8 to FIG. 10 illustrate detection examples of a skeletal structure. By using a skeleton estimation technology such as OpenPose, the skeletal structure detection unit 102 detects a skeletal structure of the human-body model (two-dimensional skeleton model) 300 as illustrated in FIG. 7 from a two-dimensional image. The human-body model 300 is a two-dimensional model constituted of keypoints such as joints of a person and bones connecting the keypoints.

For example, the skeletal structure detection unit 102 extracts a feature point that may be a keypoint from an image and detects each keypoint of a person by referring to information acquired by performing machine learning on images of keypoints. In the example in FIG. 7, the head A1, the neck A2, the right shoulder A31, the left shoulder A32, the right elbow A41, the left elbow A42, the right hand A51, the left hand A52, the right hip A61, the left hip A62, the right knee A71, the left knee A72, the right foot A81, and the left foot A82 are detected as keypoints of a person. Furthermore, a bone B1 connecting the head A1 to the neck A2, a bone B21 and a bone B22 respectively connecting the neck A2 to the right shoulder A31 and the left shoulder A32, a bone B31 and a bone B32 respectively connecting the right shoulder A31 to the right elbow A41 and the left shoulder A32 to the left elbow A42, a bone B41 and a bone B42 respectively connecting the right elbow A41 to the right hand A51 and the left elbow A42 to the left hand A52, a bone B51 and a bone B52 respectively connecting the neck A2 to the right hip A61 and the left hip A62, a bone B61 and a bone B62 respectively connecting the right hip A61 to the right knee A71 and the left hip A62 to the left knee A72, and a bone B71 and a bone B72 respectively connecting the right knee A71 to the right foot A81 and the left knee A72 to the left foot A82 are detected as bones of the person connecting the keypoints. The skeletal structure detection unit 102 stores the detected skeletal structure of a person into the database 110.

FIG. 8 is an example of detecting a person in a standing state. In FIG. 8, an image of a standing person is captured from the front, the bone B1, the bone B51 and the bone B52, the bone B61 and the bone B62, and the bone B71 and the bone B72 that are viewed from the front are detected without overlapping, and the bone B61 and the bone B71 in the right leg are somewhat bent relative to the bone B62 and the bone B72 in the left leg.

FIG. 9 is an example of detecting a person in a squatting state. In FIG. 9, an image of a squatting person is captured from the right side, the bone B1, the bone B51 and the bone B52, the bone B61 and the bone B62, and the bone B71 and the bone B72 that are viewed from the right side are detected, and the bone B61 and the bone B71 in the right leg, and the bone B62 and the bone B72 in the left leg are significantly bent and overlap each other.

FIG. 10 is an example of detecting a person in a lying state. In FIG. 10, an image of a lying person is captured from the diagonally left front, the left front bone B1, the bone B51 and the bone B52, the bone B61 and the bone B62, and the bone B71 and the bone B72 that are viewed from the diagonally left front are detected, and the bone B61 and the bone B71 in the right leg and the bone B62 and the bone B72 in the left leg are bent and overlap each other.

Next, as described in FIG. 3, the feature value computation unit 103 computes a feature value of the detected skeletal structure (S103). For example, when the height and the area of a skeleton region is set to be a feature value, the feature value computation unit 103 extracts a region including the skeletal structure and finds the height (pixel count) and the area (pixel area) of the region. The height and the area of the skeleton region is found from coordinates of an end of the extracted skeleton region and coordinates of a keypoint at the end. The feature value computation unit 103 stores the found feature value of the skeletal structure into the database 110. Note that the feature value of the skeletal structure is also used as information indicating the state of the person.

In the example in FIG. 8, a skeleton region including all the bones is extracted from a skeletal structure of the standing person. In this case, the upper end of the skeleton region is the keypoint A1 of the head, the lower end of the skeleton region is the keypoint A82 of the left foot, the left end of the skeleton region is the keypoint A41 of the right elbow, and the right end of the skeleton region is the keypoint A52 of the left hand. Therefore, the height of the skeleton region is found from the difference between the Y-coordinates of the keypoint A1 and the keypoint A82. Further, the width of the skeleton region is found from the difference between the X-coordinates of the keypoint A41 and the keypoint A52, and the area is found from the height and the width of the skeleton region.

In the example in FIG. 9, a skeleton region including all the bones is extracted from a skeletal structure of the squatting person. In this case, the upper end of the skeleton region is the keypoint A1 of the head, the lower end of the skeleton region is the keypoint A81 of the right foot, the left end of the skeleton region is the keypoint A61 of the right hip, and the right end of the skeleton region is the keypoint A51 of the right hand. Therefore, the height of the skeleton region is found from the difference between the Y-coordinates of the keypoint A1 and the keypoint A81. Further, the width of the skeleton region is found from the difference between the X-coordinates of the keypoint A61 and the keypoint A51, and the area is found from the height and the width of the skeleton region.

In the example in FIG. 10, a skeleton region including all the bones is extracted from a skeletal structure of the lying person. In this case, the upper end of the skeleton region is the keypoint A32 of the left shoulder, the lower end of the skeleton region is the keypoint A52 of the left hand, the left end of the skeleton region is the keypoint A51 of the right hand, and the right end of the skeleton region is the keypoint A82 of the left foot. Therefore, the height of the skeleton region is found from the difference between the Y-coordinates of the keypoint A32 and the keypoint A52. Further, the width of the skeleton region is found from the difference between the X-coordinates of the keypoint A51 and the keypoint A82, and the area is found from the height and the width of the skeleton region.

Figure 11:
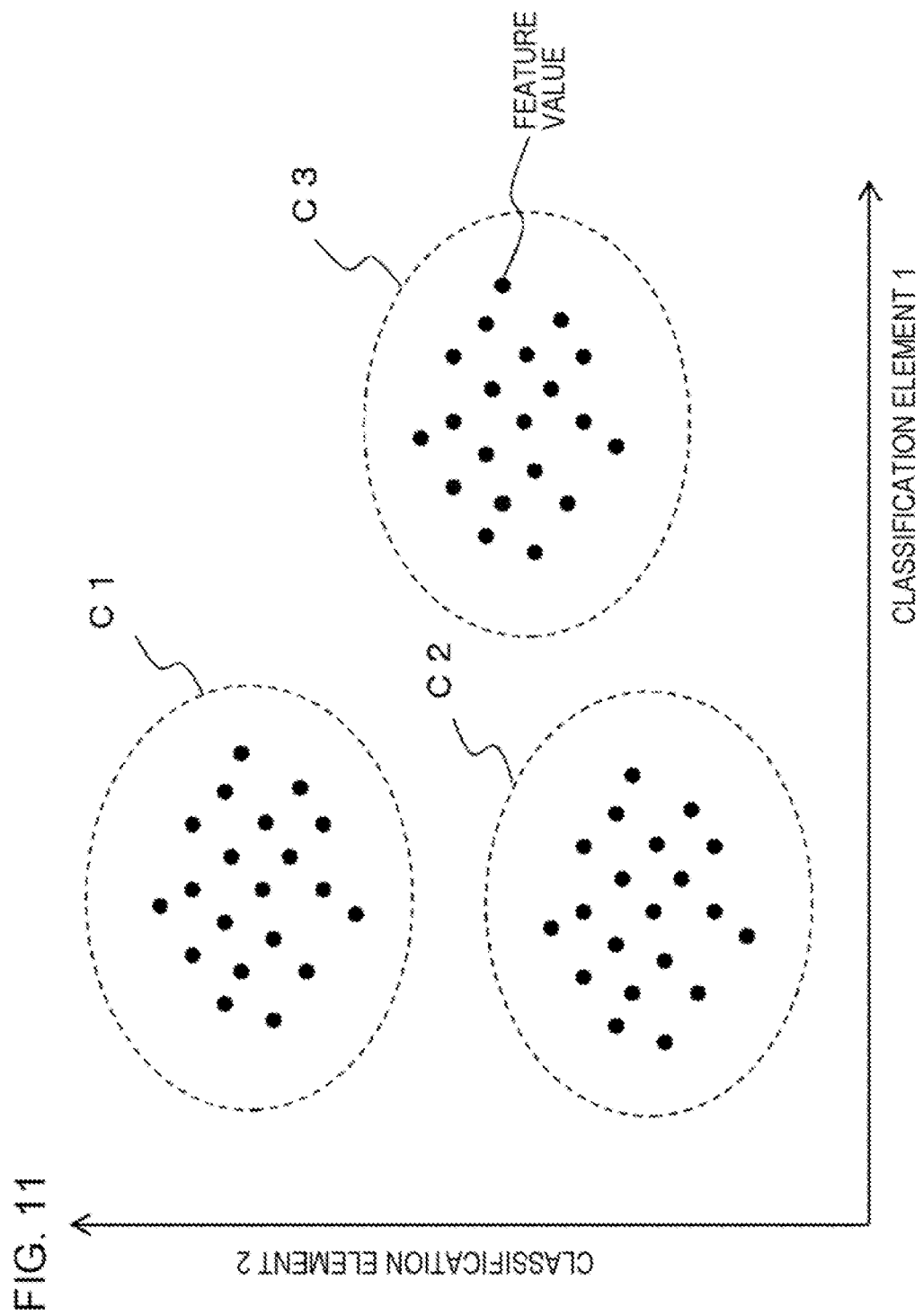
FIG. 11 is a graph illustrating a specific example of the classification method according to the example embodiment 1.

Next, as described in FIG. 3, the classification unit 104 performs the classification processing (S104). In the classification processing, as described in FIG. 4, the classification unit 104 computes a degree of similarity between computed feature values of skeletal structures (S111) and classifies skeletal structures, based on the computed feature values (S112). The classification unit 104 finds a degree of similarity between feature values of all skeletal structures being classification targets and being stored in the database 110 and classifies (clusters) skeletal structures (poses) with the highest degree of similarity as the same cluster. Furthermore, the classification unit 104 finds and classifies degrees of similarity between the classified clusters and repeats classification until the number of clusters reaches a predetermined number. FIG. 11 illustrates an image of a classification result of feature values of skeletal structures. FIG. 11 is an image of cluster analysis based on two-dimensional classification elements, and for example, the two classification elements are the height of a skeleton region and the area of the skeleton region. As a result of classification, feature values of a plurality of skeletal structures are classified into three clusters C1 to C3 in FIG. 11. For example, the clusters C1 to C3 are related to poses such as a standing pose, a sitting pose, and a lying pose, and skeletal structures (persons) are classified for each similar pose.

According to the present example embodiment, diverse classification methods can be used by performing classification, based on a feature value of a skeletal structure of a person. Note that a classification method may be preset or may be freely set by a user. Further, classification may be performed by the same method as a retrieval method to be described later. In other words, classification may be performed based on a classification condition similar to the search condition. For example, the classification unit 104 performs classification by the following classification methods. One of the classification methods may be used, or freely selected classification methods may be combined.

Classification Method 1

Classification is based on a plurality of layers. Classification is performed by hierarchically combining classification based on a skeletal structure of the whole body, classification based on a skeletal structure of the upper half of the body or the lower half of the body, classification based on a skeletal structure of an arm or a leg, and the like. Specifically, classification may be performed based on feature values of a first part and a second part of a skeletal structure and may be further performed by weighting the feature values of the first part and the second part.

Classification Method 2

Classification is based on a plurality of images along a time series. Classification is performed based on feature values of skeletal structures in a plurality of chronologically continuous images. For example, feature values may be accumulated in a time series direction, and classification may be performed based on the accumulated values. Classification may be further performed based on a change (variation) in the feature values of the skeletal structures in the plurality of consecutive images.

Classification Method 3

Classification is based on neglecting left and right sides of a skeletal structure. Skeletal structures of persons the right side and the left side of which are opposite are classified as the same skeletal structure.

Figure 12:
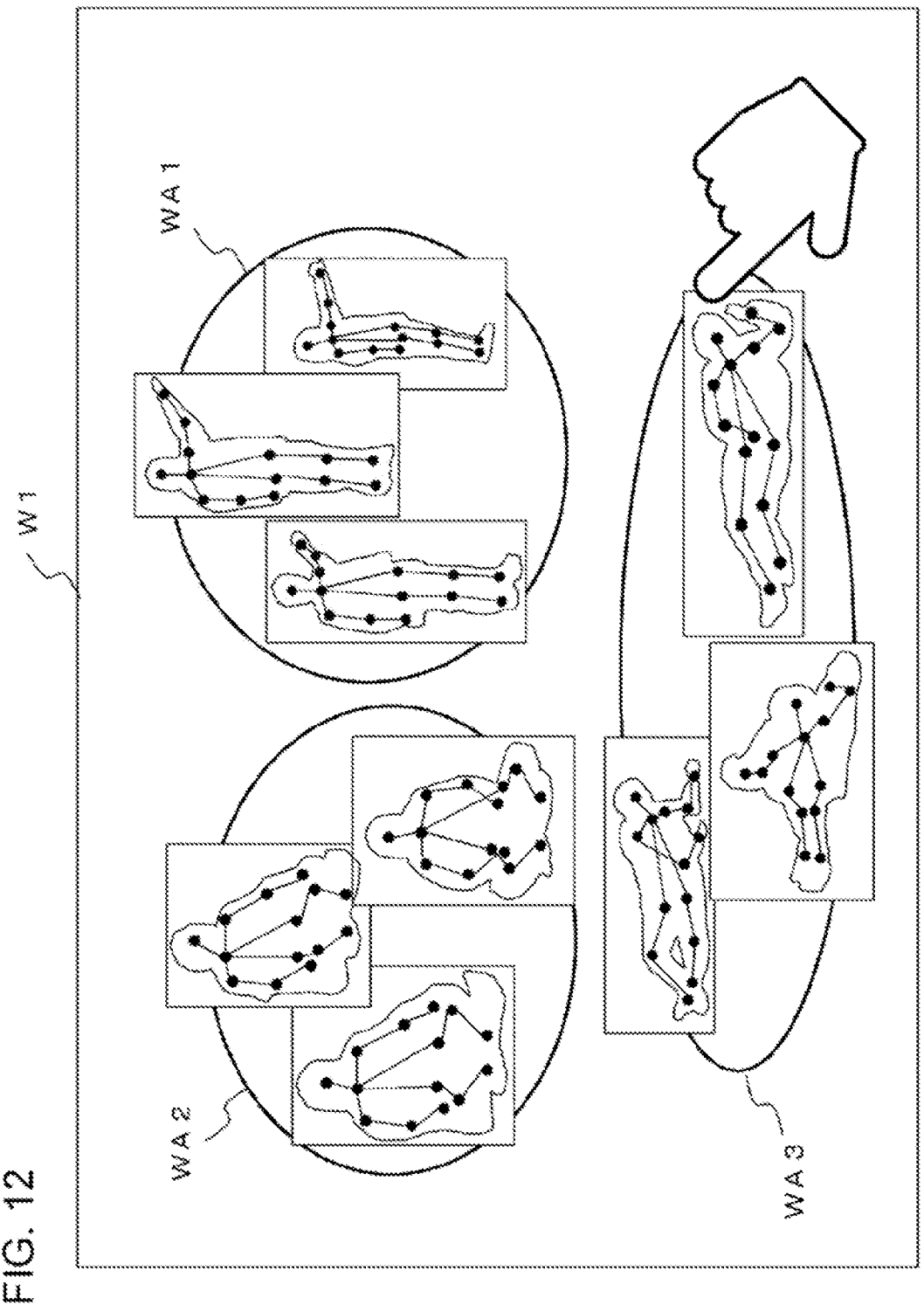
FIG. 12 is a diagram illustrating a display example of a classification result according to the example embodiment 1.

Furthermore, the classification unit 104 displays the classification result of skeletal structures (S113). The classification unit 104 acquires required skeletal structures and required images of persons from the database 110 and displays skeletal structures and persons on the display unit 107 for each similar pose (cluster) as the classification result. FIG. 12 illustrates a display example when poses are classified into three. For example, as illustrated in FIG. 12, pose regions WA1 to WA3 for respective poses are displayed on a display window W1, and skeletal structures and persons (images) for poses falling under the pose regions WA1 to WA3, respectively, are displayed. For example, the pose region WA1 is a display region for the standing pose and displays skeletal structures and persons that are similar to the standing pose and are classified as the cluster C1. For example, the pose region WA2 is a display region for the sitting pose and displays skeletal structures and persons that are similar to the sitting pose and are classified as the cluster C2. For example, the pose region WA3 is a display region for the lying pose and displays skeletal structures and persons that are similar to the lying pose and are classified as the cluster C2.

Next, as described in FIG. 3, the image processing apparatus 100 performs the retrieval processing (S105). In the retrieval processing, the image processing apparatus 100 accepts input of a search condition, as described in FIG. 5 (S121).

An example of the processing in S121 will be described by using FIG. 44. The image acquisition unit 101 acquires candidates of one or a plurality of query images by one of the acquisition examples 1 to 3 described above (S321). Next, the skeletal structure detection unit 102 detects a two-dimensional skeletal structure of a person included in a candidate of each query image (S322). Next, the query evaluation unit 109 computes an evaluation value of a candidate in each query image, based on the detection result of the two-dimensional skeletal structure in S322 (S323).

Next, based on the evaluation value computed in S323, the selection unit 11I selects a query image out of the candidates of the query image (S324). Next, the feature value computation unit 103 computes a feature value of a two-dimensional skeletal structure detected from the query image selected in S324 (S325). The feature value of the two-dimensional skeletal structure detected from the query image becomes a search query.

Returning to FIG. 5, the retrieval unit 105 subsequently retrieves a skeletal structure, based on the search condition (S122). The retrieval unit 105 retrieves a skeletal structure with a high degree of similarity of feature values out of skeletal structures being search targets and being stored in the database 110, with a skeletal structure specified by a user as a search query. The retrieval unit 105 computes a degree of similarity between a feature value of the skeletal structure being the search query and a feature value of a skeletal structure being a search target (a feature value of a skeletal structure detected from an analysis target image) and extracts a skeletal structure with a computed degree of similarity higher than a predetermined threshold value. A previously computed feature value may be used as the feature value of the skeletal structure being the search query, or a feature value found at retrieval may be used. Note that a search query may be input by moving a part of a skeletal structure according to a user operation; or a pose demonstrated by a user in front of the camera may be set to be a search query.

According to the present example embodiment, diverse retrieval methods can be used by performing retrieval, based on a feature value of a skeletal structure of a person, similarly to the classification method. Note that the retrieval method may be preset or may be freely set by a user. For example, the retrieval unit 105 performs retrieval by the following retrieval methods. One of the retrieval methods may be used, or freely selected retrieval methods may be combined. Retrieval may be performed by combining a plurality of retrieval methods (search conditions) by a logical formula [such as a logical product (AND), a logical sum (OR), or a negation (NOT)]. For example, retrieval may be performed with "(a pose of raising the right hand) AND (a pose of lifting the left foot)" as a search condition.

Retrieval Method 1

Figure 13:
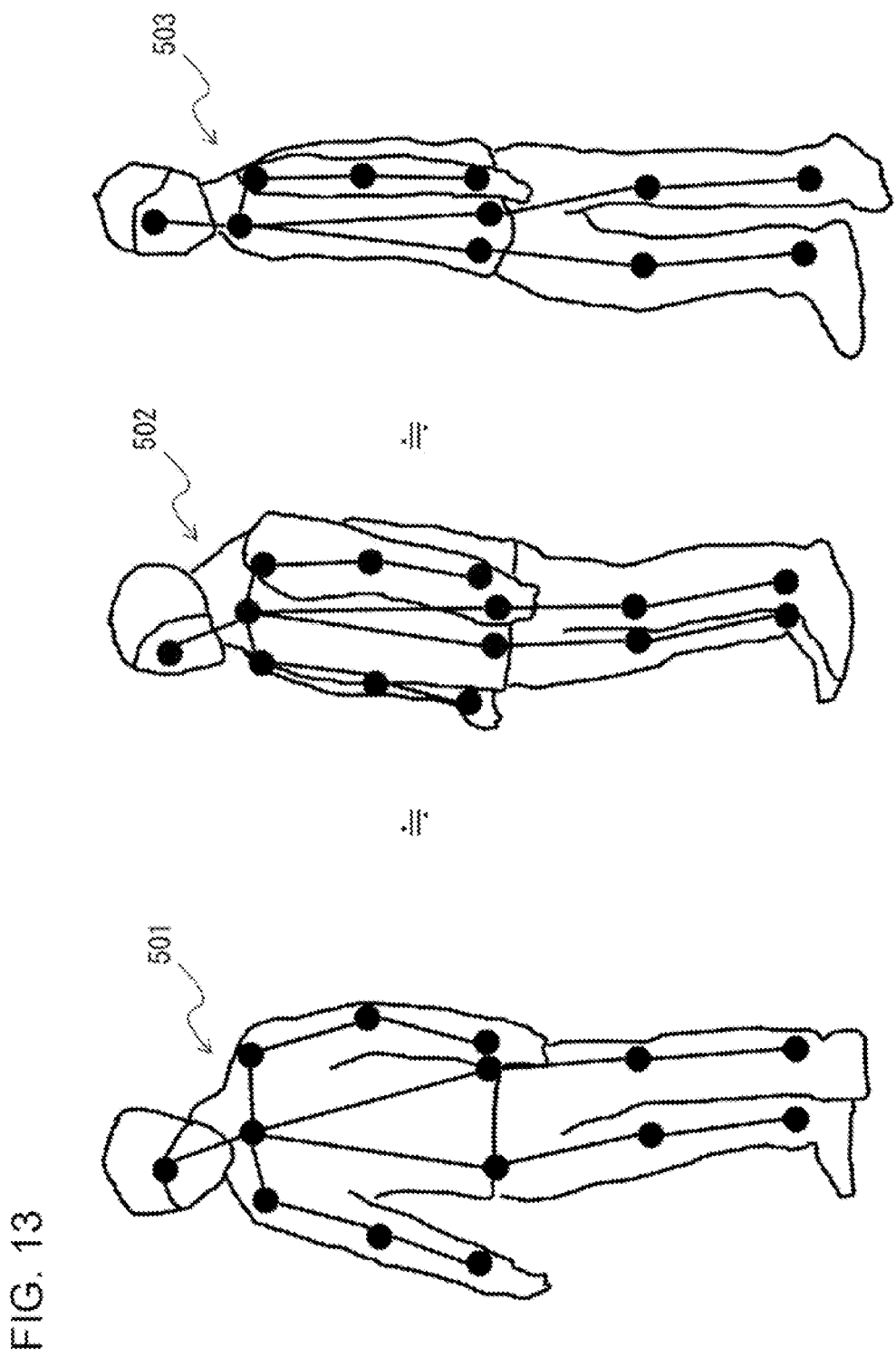
FIG. 13 is a diagram for illustrating the retrieval method according to the example embodiment 1.

Retrieval is based on only a feature value in a height direction. Retrieval using only a feature value in a height direction of a person allows suppression of an effect of a change in a lateral direction of the person and improves robustness to a change in the orientation and the body shape of the person. For example, even when the orientations and body shapes of persons are different as is the case with skeletal structures 501 to 503 in FIG. 13, a feature value in the height direction does not change significantly. Therefore, the skeletal structures 501 to 503 can be determined to be in the same pose at retrieval (at classification).

Retrieval Method 2

Figure 14:
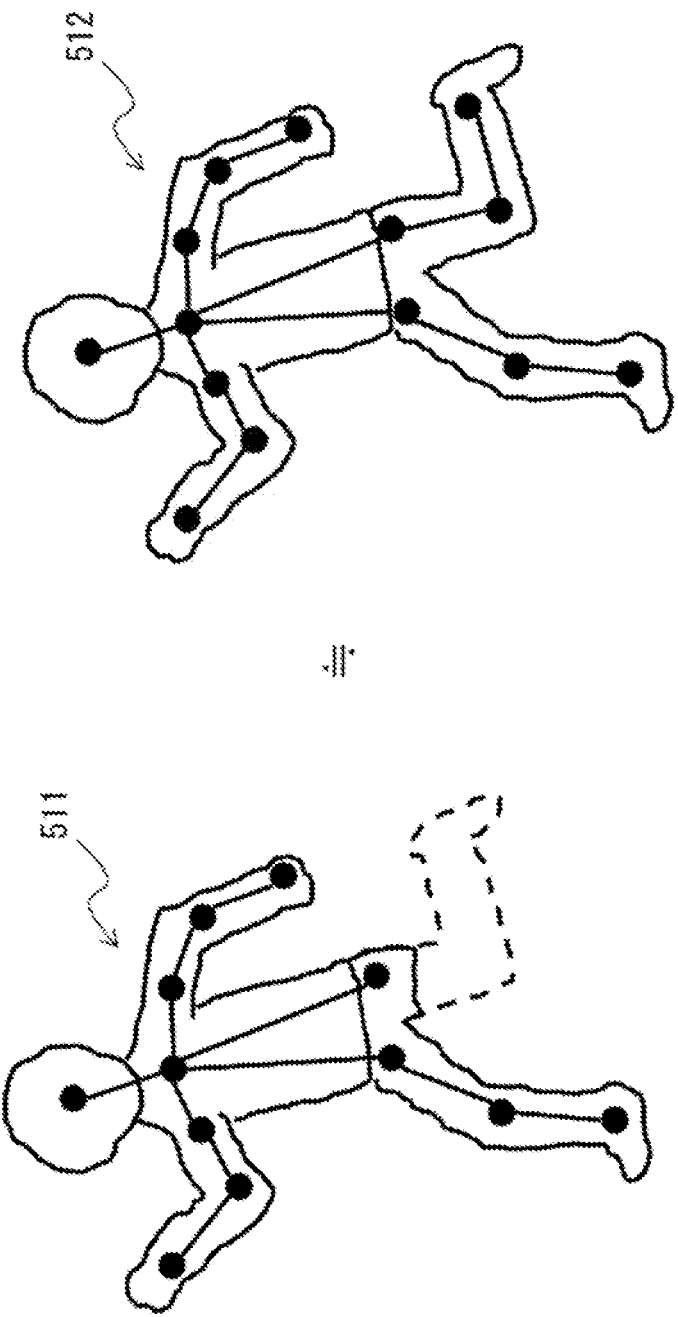
FIG. 14 is a diagram for illustrating the retrieval method according to the example embodiment 1.
Figure 15:
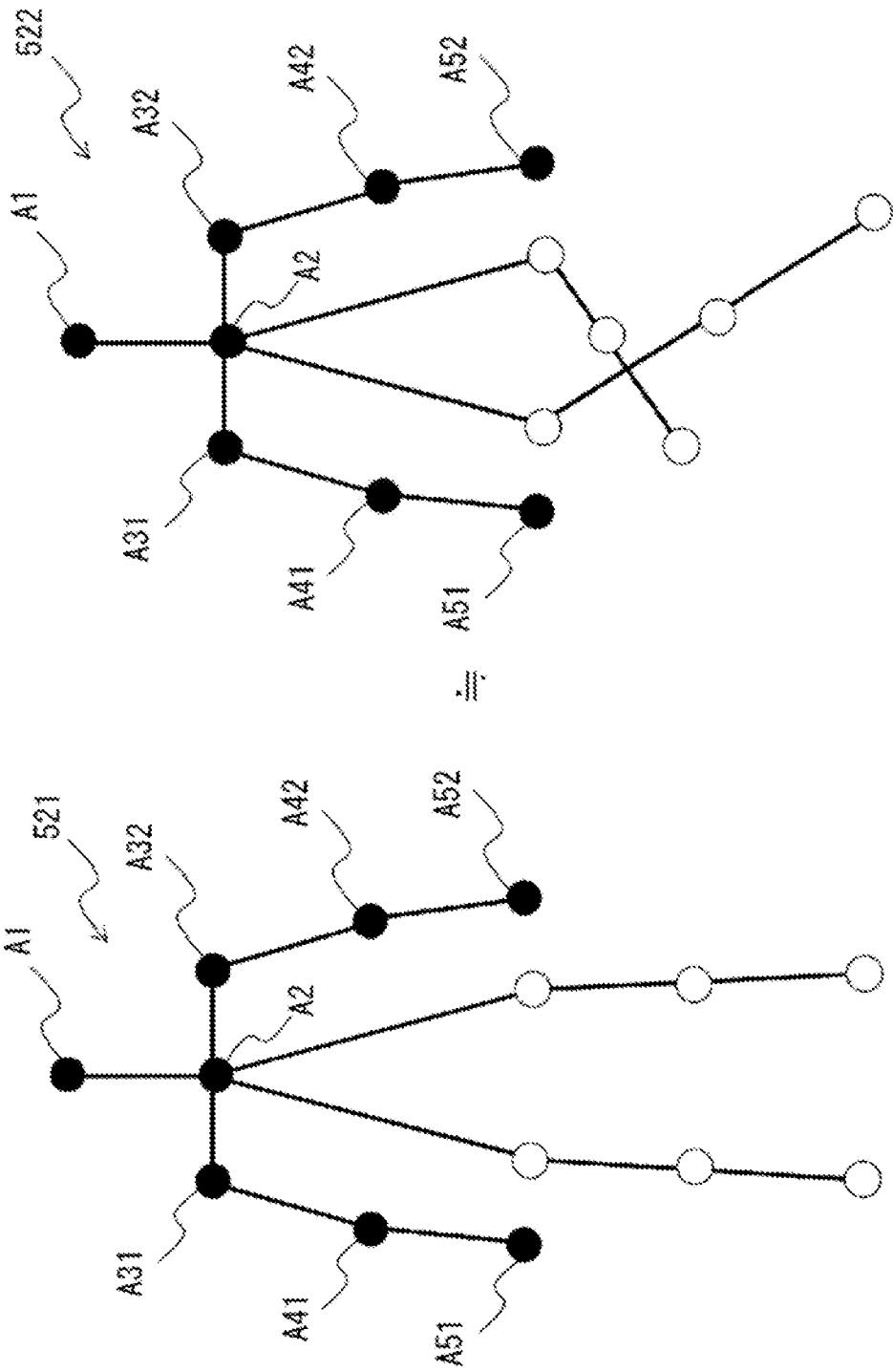
FIG. 15 is a diagram for illustrating the retrieval method according to the example embodiment 1.

When part of the body of a person is hidden in a partially retrieved image, retrieval is performed by using only information about the recognizable part. For example, even when a keypoint of the left foot cannot be detected due to the left foot being hidden, retrieval can be performed by using a feature value of another keypoint being detected, as illustrated in skeletal structures 511 and 512 in FIG. 14. Therefore, the skeletal structures 511 and 512 can be determined to be the same pose at retrieval (at classification). In other words, classification and retrieval can be performed by using feature values of part of keypoints instead of all keypoints. In an example of skeletal structures 521 and 522 in FIG. 15, while the orientations of both feet are different, the structures can be determined to be in the same pose by setting feature values of keypoints of the upper half of the body (A1, A2, A31, A32, A41, A42, A51, and A52) to be a search query. Further, retrieval may be performed by weighting a part (feature point) to be retrieved, or a threshold value for similarity determination may be changed. When part of the body is hidden, retrieval may be performed while neglecting the hidden part or may be performed in consideration of the hidden part. Performing retrieval including the hidden part allows retrieval of poses in which the same part is hidden.

Retrieval Method 3

Figure 16:
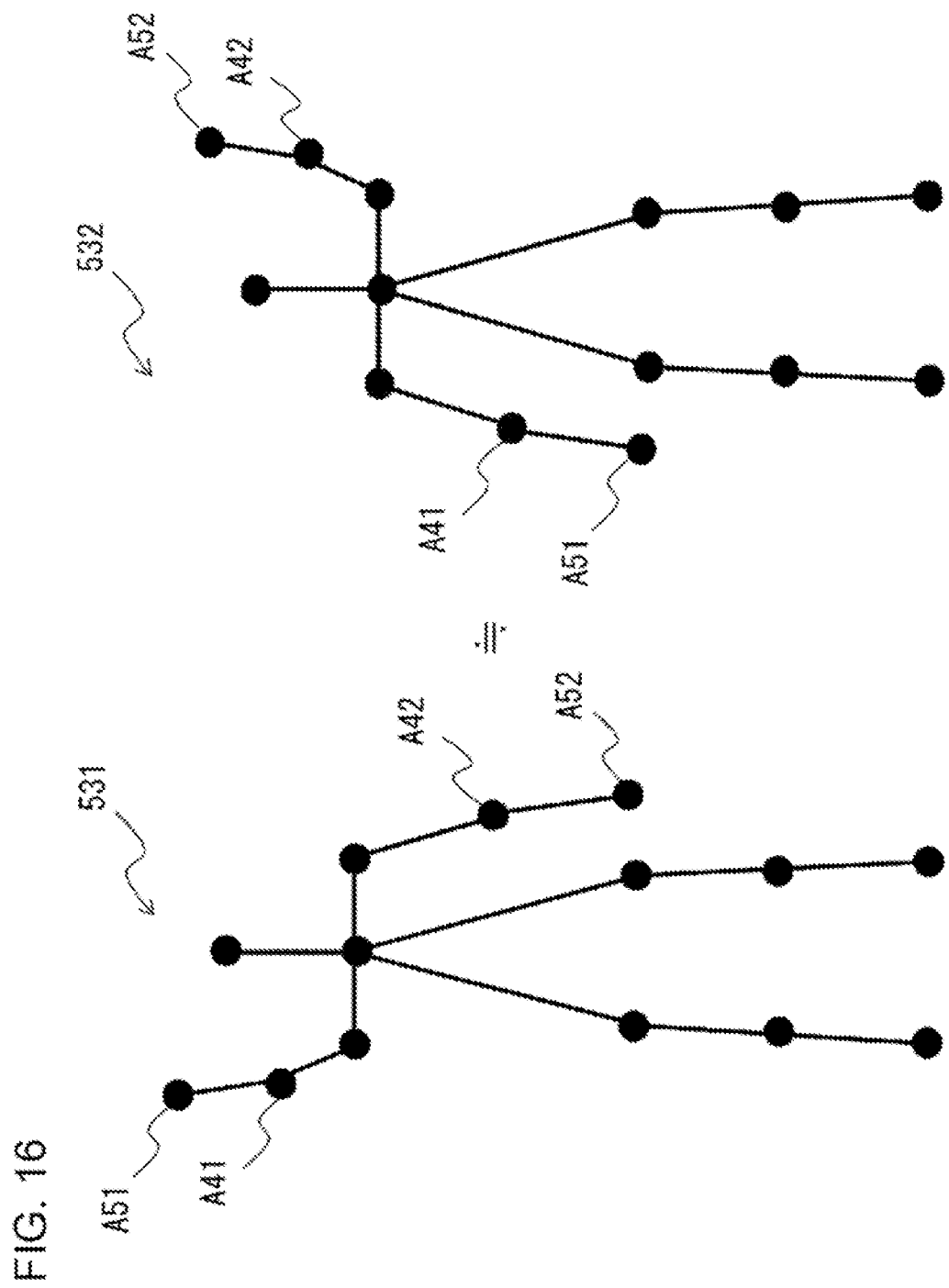
FIG. 16 is a diagram for illustrating the retrieval method according to the example embodiment 1.

Retrieval is based on neglecting left and right sides of a skeletal structure. Skeletal structures of persons the right side and the left side of which are opposite are retrieved as the same skeletal structure. For example, a pose of raising the right hand and a pose of raising the left hand as is the case with skeletal structures 531 and 532 in FIG. 16 can be retrieved (classified) as the same pose. In the example in FIG. 16, while the positions of the keypoint A51 of the right hand, the keypoint A41 of the right elbow, the keypoint A52 of the left hand, and the keypoint A42 of the left elbow differ between the skeletal structure 531 and the skeletal structure 532, the positions of the remaining keypoints are the same. With regard to the keypoint A51 of the right hand and the keypoint A41 of the right elbow in the skeletal structure 531, and the keypoint A52 of the left hand and the keypoint A42 of the left elbow in the skeletal structure 532, reversing the right and left sides of the keypoints in one skeletal structure causes the keypoints to be in the same positions in the other skeletal structure, and, with regard to the keypoint A52 of the left hand and the keypoint A42 of the left elbow in the skeletal structure 531, and the keypoint A51 of the right hand and the keypoint A41 of the right elbow in the skeletal structure 532, reversing the right and left sides of the keypoints in one skeletal structure causes the keypoints to be in the same positions in the other skeletal structure; and therefore the structures are determined to be in the same pose.

Retrieval Method 4

Retrieval is based on feature values in a longitudinal direction and a lateral direction. Retrieval is performed with only a feature value of a person in the longitudinal direction (Y-axis direction) and then retrieval is further performed on the acquired result by using a feature value of the person in the lateral direction (X-axis direction).

Retrieval Method 5

Retrieval is based on a plurality of images along a time series. Retrieval is performed based on feature values of skeletal structures in a plurality of chronologically continuous images. For example, feature values may be accumulated in a time series direction, and retrieval may be performed based on the accumulated values. Retrieval may be further performed based on a change (variation) in the feature values of the skeletal structures in the plurality of consecutive images.

Figure 17:
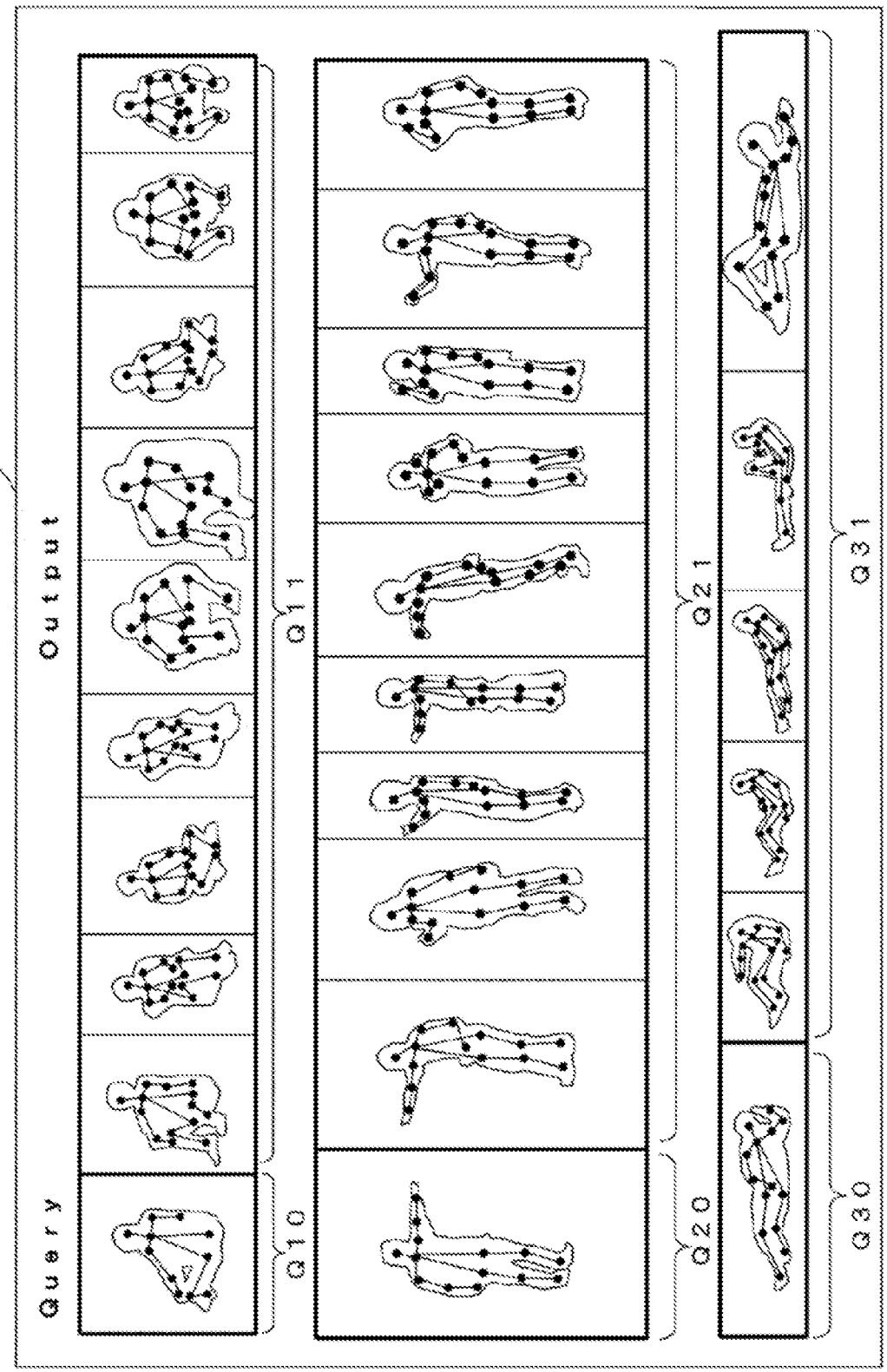
FIG. 17 is a diagram illustrating a display example of a retrieval result according to the example embodiment 1.

Furthermore, the retrieval unit 105 displays the retrieval result of skeletal structures (S123). The retrieval unit 105 acquires a required skeletal structures and a required image of a person from the database 110 and displays the skeletal structure and the person that are acquired as the retrieval result on the display unit 107. For example, when a plurality of search queries (search conditions) are specified, the retrieval unit 105 displays a retrieval result for each search query. FIG. 17 illustrates a display example of performing retrieval, based on three search queries (poses). For example, in a display window W2, skeletal structures and persons for specified search queries Q10, Q20, and Q30 are displayed at the left end, and skeletal structures and persons for respective retrieval results Q11, Q21, and Q31 of the search queries Q10, Q20, and Q30 are displayed side by side on the right side of the search queries, as illustrated in FIG. 17.

An order in which a retrieval result is displayed side by side from next to a search query may be a chronological order of discovery of an applicable skeletal structure or a descending order of degree of similarity. When retrieval is performed with a part (feature point) in partial retrieval being weighted, a retrieval result may be displayed in descending order of similarity computed with weighting. A retrieval result may be displayed in descending order of similarity computed only from a part (feature point) selected by a user. Further, images (frames) before and after an image (frame) in a retrieval result in a time series, the images centering on the image in the retrieval result, may be extracted for a certain period of time and be displayed.

As described above, the present example embodiment enables detection of a skeletal structure of a person from a two-dimensional image, and classification and retrieval based on a feature value of the detected skeletal structure. Thus, classification for each group of similar poses with a high degree of similarity and retrieval of a similar pose with a high degree of similarity to a search query (search key) are enabled. Classification of similar poses from an image and display thereof enable recognition of a pose of a person in the image without specification of a pose or the like by a user. A user can specify a pose being a search query from a classification result, and therefore even when the user does not previously recognize a pose to be retrieved in detail, a desired pose can be retrieved. For example, classification and retrieval can be performed with the whole or part of a skeletal structure of a person as a condition, and therefore flexible classification and retrieval are enabled.

Further, when acquiring candidates of a query image, the image processing apparatus 100 according to the present example embodiment computes an evaluation value for each candidate. The evaluation value is an indicator of whether the candidate is an image allowing excellent extraction of a feature part of a state of a person by computer processing. Then, based on such evaluation values, the image processing apparatus 100 selects a query image out of the candidates of a query image and performs retrieval, based on the selected query image. Such an image processing apparatus 100 enables selection of an image preferable for retrieval as a query image. Then, high-precision retrieval of an image including a person in a predetermined state is enabled.

Further, the image processing apparatus 100 according to the present example embodiment can compute an evaluation value, based on at least one of the number of extracted keypoints and a confidence level of each extracted keypoint. Further, the image processing apparatus 100 can compute an evaluation value, based on the size of a person in an image. Such an image processing apparatus 100 enables computation of an evaluation value well representing whether the image is an image allowing excellent extraction of a feature part of a state of a person by computer processing.

Further, the image processing apparatus 100 according to the present example embodiment can compute an evaluation value, based on a weight value of each of a plurality of keypoints set based on a user input. Such an image processing apparatus 100 enables precise evaluation of whether the image is an image allowing excellent extraction of, by computer processing, a particularly characteristic part in a state of a person to be retrieved. For example, when a person raising the right hand is to be retrieved, the right hand part is a particularly characteristic part. Then, a weight value of a keypoint included in the right hand part is set relatively high.

Further, the image processing apparatus 100 according to the present example embodiment can determine part of keypoints by "processing of accepting a user input for enclosing part of the body of a person with a frame in an image indicating the body and determining a keypoint included in the frame," "processing of accepting a user input for specifying part of keypoints in an image indicating the body of a person and keypoints of the body and determining the specified keypoints," or "processing of accepting a user input for specifying a part of the body of a person by the name of the part and determining a keypoint included in the specified part" and set a weight value of the determined keypoint, based on a user input. Such an image processing apparatus 100 enables a user to easily specify a desired keypoint. In other words, a mechanism with high operability and user-friendliness is provided.

Further, when acquiring candidates of a query image, the image processing apparatus 100 according to the present example embodiment can compute an evaluation value and provide a user with the computed evaluation value. Then, the image processing apparatus can subsequently accept a user input for selecting the query image out of the candidates of the query image and perform retrieval based on the selected query image. Such an image processing apparatus 100 enables a user to easily select a desired query image out of candidates of the query image, based on an evaluation value. The above is particularly useful when there are many candidates of a query image.

Example Embodiment 2

An example embodiment 2 will be described below with reference to drawings. Specific examples of the feature value computation according to the example embodiment 1 will be described in the present example embodiment. According to the present example embodiment, a feature value is found by normalization using the height of a person. The remainder is similar to the example embodiment 1.

Figure 18:
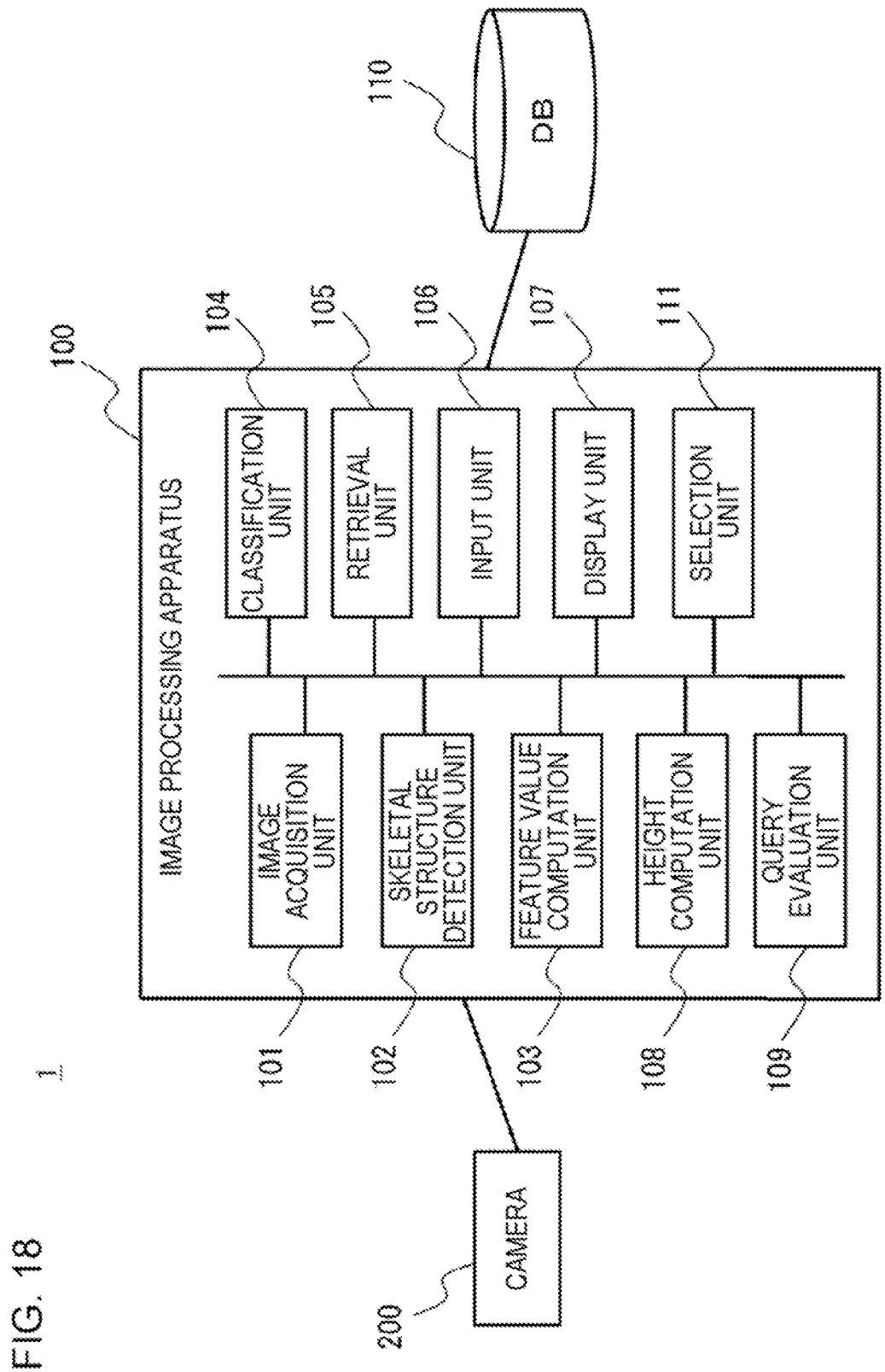
FIG. 18 is a configuration diagram illustrating a configuration of an image processing apparatus according to an example embodiment 2.

FIG. 18 illustrates a configuration of an image processing apparatus 100 according to the present example embodiment. As illustrated in FIG. 18, the image processing apparatus 100 further includes a height computation unit 108 in addition to the configuration according to the example embodiment 1. Note that a feature value computation unit 103 and the height computation unit 108 may constitute one processing unit.

Based on a two-dimensional skeletal structure detected by a skeletal structure detection unit 102, the height computation unit (height estimation unit) 108 computes (estimates) the height of a standing person in a two-dimensional image (referred to as a height pixel count). The height pixel count may be considered to be the height of the person in the two-dimensional image (the length of the whole body of the person in the two-dimensional image space). The height computation unit 108 finds the height pixel count (pixel count) from the length of each bone in the detected skeletal structure (the length in the two-dimensional image space).

In the following example, specific examples 1 to 3 are used as methods for finding a height pixel count. Note that one of the methods in the specific examples 1 to 3 may be used, or a plurality of freely selected methods may be used in combination. In the specific example 1, a height pixel count is found by totaling the lengths of bones from the head to the foot out of bones of a skeletal structure. When the skeletal structure detection unit 102 (skeleton estimation technology) does not output the top of the head and the foot, a correction may be made by multiplying a constant as needed. In the specific example 2, a height pixel count is computed by using a human-body model indicating a relation between the length of each bone and the length of the whole body (the height in a two-dimensional image space). In the specific example 3, a height pixel count is computed by fitting a three-dimensional human-body model to a two-dimensional skeletal structure.

The feature value computation unit 103 according to the present example embodiment is a normalization unit normalizing a skeletal structure (skeleton information) of a person, based on a computed height pixel count of the person. The feature value computation unit 103 stores a feature value of the normalized skeletal structure (normalized value) into a database 110. The feature value computation unit 103 normalizes the height of each keypoint (feature point) included in the skeletal structure in an image by the height pixel count. For example, a height direction according to the present example embodiment is a vertical direction (Y-axis direction) in a two-dimensional coordinate (X-Y coordinate) space of the image. In this case, the height of a keypoint can be found from the Y-coordinate value (pixel count) of the keypoint. Alternatively, the height direction may be a direction of a vertical projection axis (vertical projection direction) acquired by projecting a direction of a vertical axis perpendicular to the ground (reference plane) in a real-world three-dimensional coordinate space onto a two-dimensional coordinate space. In this case, the height of a keypoint can be found from a value (pixel count) along the vertical projection axis found by projecting an axis perpendicular to the real-world ground onto a two-dimensional coordinate space, based on a camera parameter. Note that the camera parameter is an image capture parameter of an image, examples of which including the pose, the position, the image capture angle, and the focal distance of a camera 200. An image of an object the length and the position of which are previously known may be captured by the camera 200, and the camera parameter may be found from the image. Distortion may occur at both ends of a captured image, and the real-world vertical direction may not match the vertical direction in the image. On the other hand, use of the parameter of a camera capturing an image allows recognition of the degree of inclination of the real-world vertical direction in the image. Therefore, by normalizing the value of a keypoint along the vertical projection axis projected onto an image by the height, based on the camera parameter, the keypoint can be converted into a feature value in consideration of deviation between the real world and the image. Note that a horizontal direction (lateral direction) is a horizontal direction (X-axis direction) in a two-dimensional coordinate (X-Y coordinate) space in an image or is a direction acquired by projecting a direction parallel to the ground in a real-world three-dimensional coordinate space onto a two-dimensional coordinate space.

Figure 19:
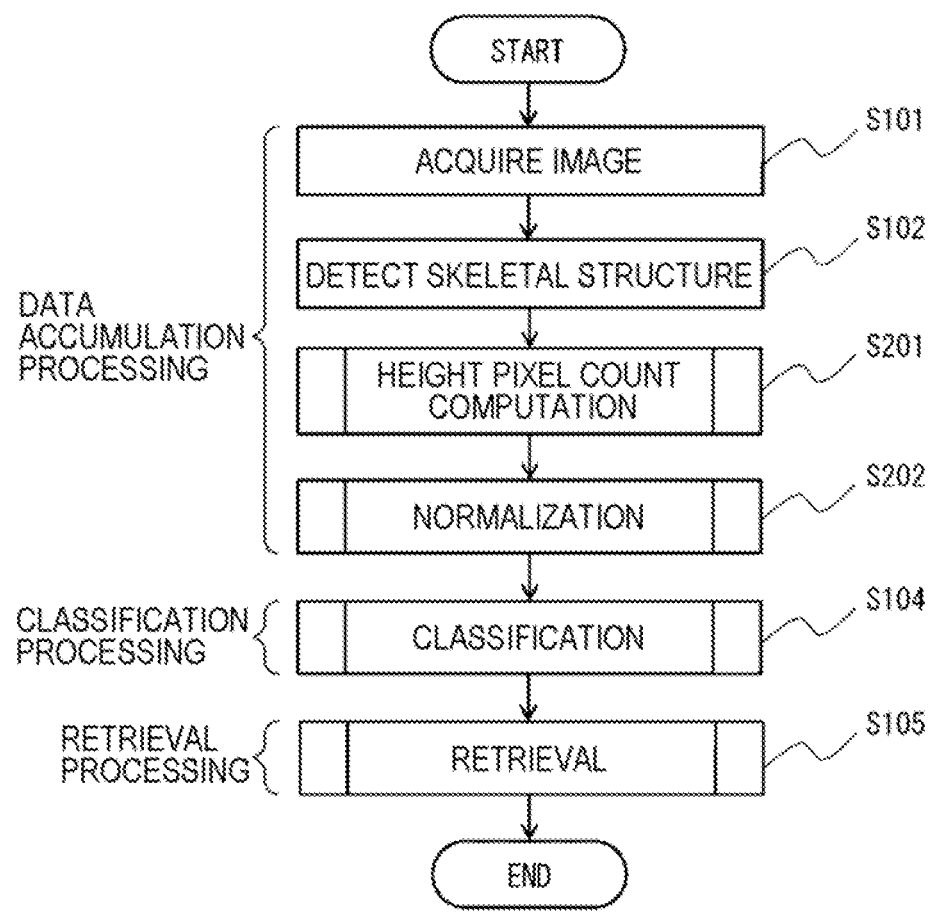
FIG. 19 is a flowchart illustrating an image processing method according to the example embodiment 2.
Figure 20:
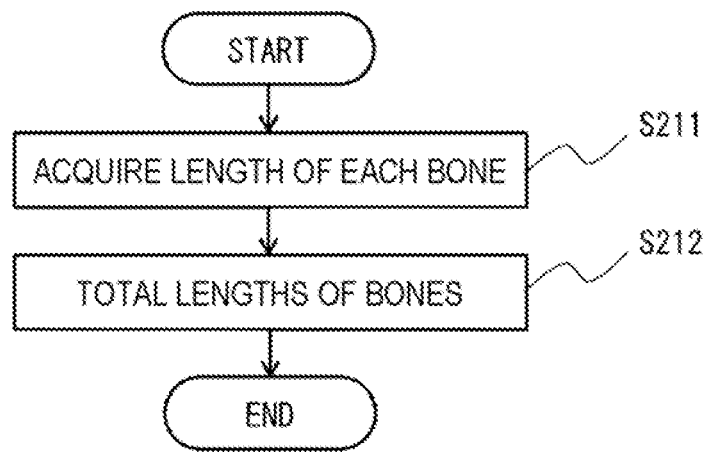
FIG. 20 is a flowchart illustrating a specific example 1 of a height pixel count computation method according to the example embodiment 2.
Figure 21:
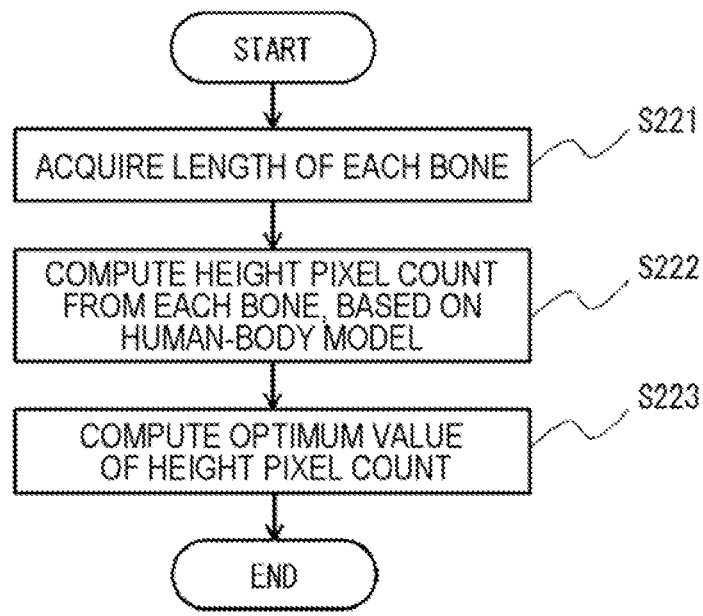
FIG. 21 is a flowchart illustrating a specific example 2 of the height pixel count computation method according to the example embodiment 2.
Figure 22:
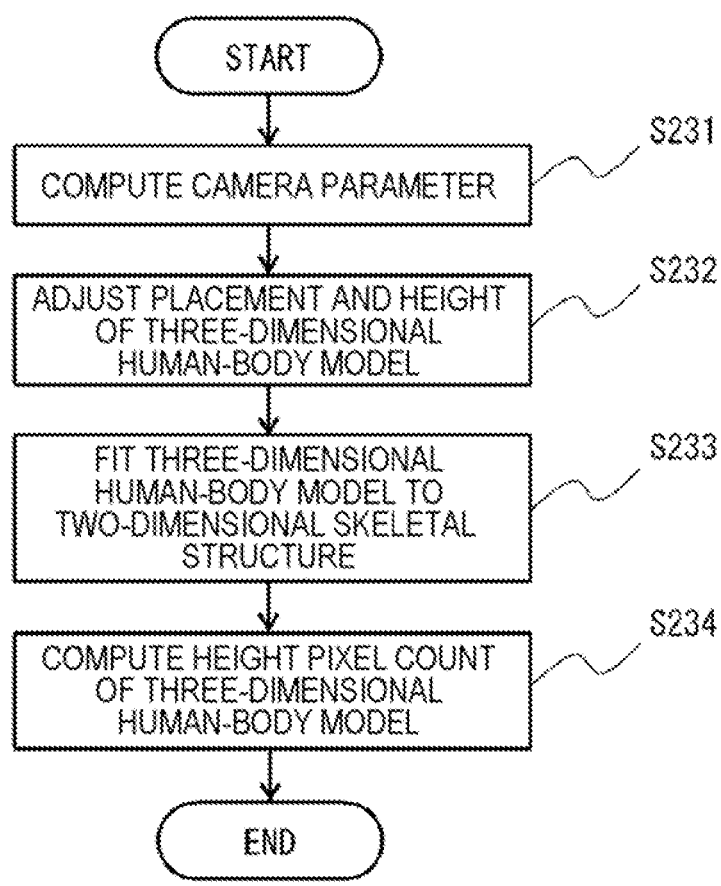
FIG. 22 is a flowchart illustrating the specific example 2 of the height pixel count computation method according to the example embodiment 2.
Figure 23:
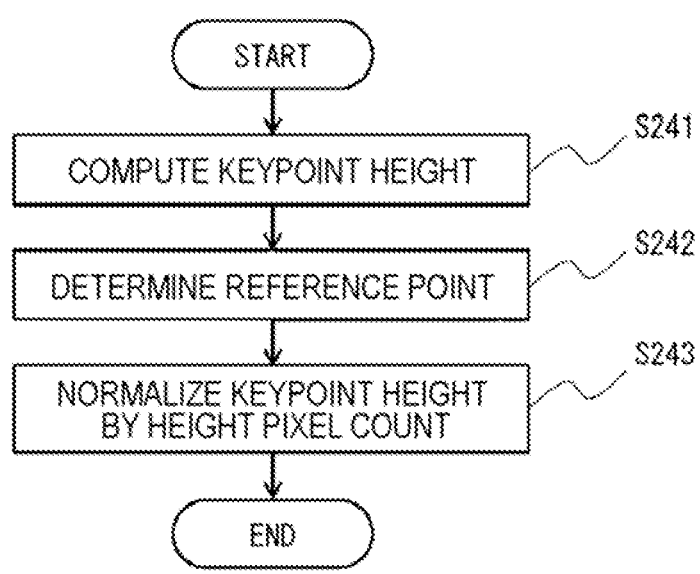
FIG. 23 is a flowchart illustrating a normalization method according to the example embodiment 2.

FIG. 19 to FIG. 23 illustrate flows of processing in the image processing apparatus 100 according to the present example embodiment. FIG. 19 illustrates a flow from image acquisition to retrieval processing in the image processing apparatus 100, FIG. 20 to FIG. 22 illustrate flows of specific examples 1 to 3 of height pixel count computation processing (S201) in FIG. 19, and FIG. 23 illustrates a flow of normalization processing (S202) in FIG. 19.

As illustrated in FIG. 19, the height pixel count computation processing (S201) and the normalization processing (S202) are performed in the present example embodiment as the feature value computation processing (S103) according to the example embodiment 1. The remainder is similar to the example embodiment 1.

Figure 24:
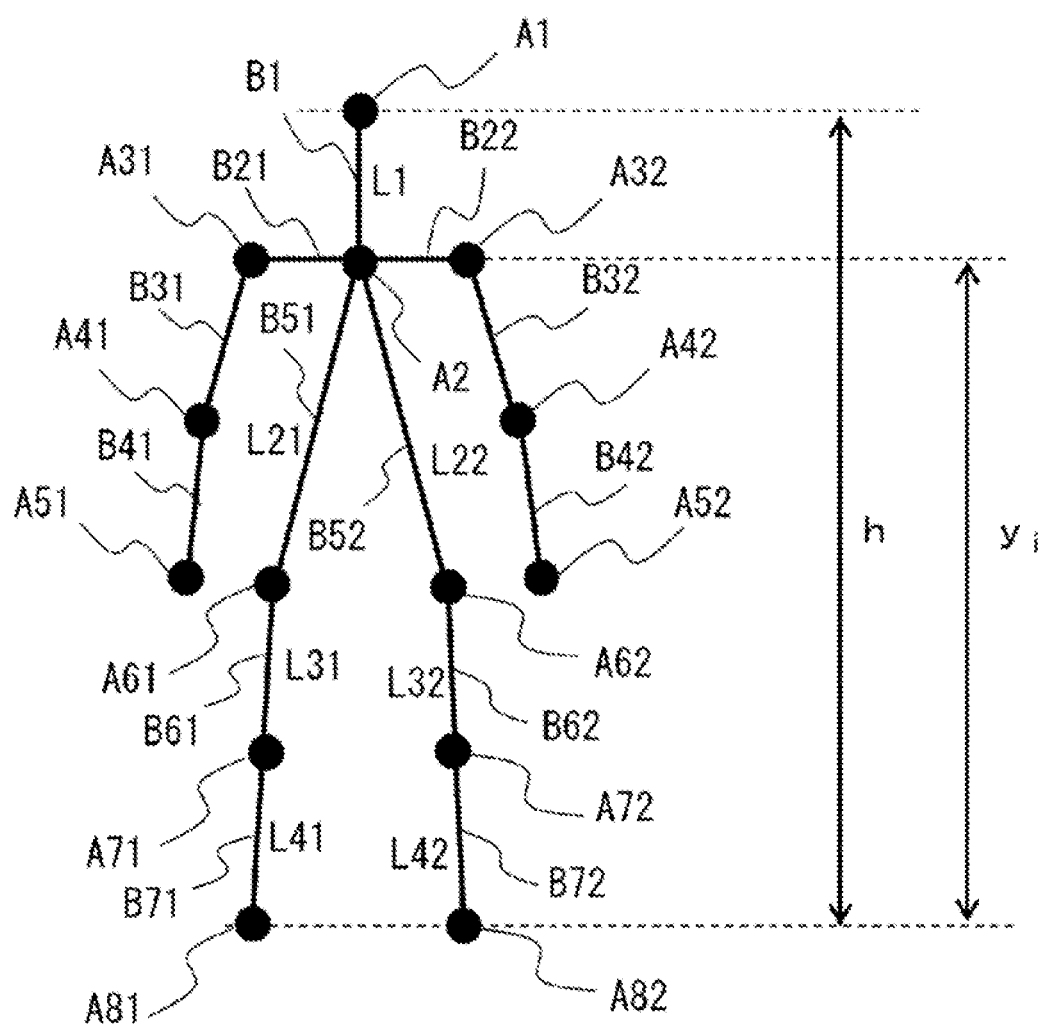
FIG. 24 is a diagram illustrating a human-body model according to the example embodiment 2.

Subsequently to image acquisition (S101) and skeletal structure detection (S102), the image processing apparatus 100 performs the height pixel count computation processing, based on the detected skeletal structure (S201). In this example, the height of a skeletal structure of a person standing upright in an image is denoted by a height pixel count (h), and the height of each keypoint of the skeletal structure in a state of the person in the image is denoted by a keypoint height (yi), as illustrated in FIG. 24. Specific examples 1 to 3 of the height pixel count computation processing will be described below.

Specific Example 1

In the specific example 1, a height pixel count is found by using the lengths of bones from the head to the foot. In the specific example 1, the height computation unit 108 acquires the length of each bone (S211) and totals the acquired lengths of the bones (S212), as described in FIG. 20.

The height computation unit 108 acquires the lengths of bones from the head to the foot of a person in a two-dimensional image and finds a height pixel count. Specifically, the height computation unit 108 acquires the length (pixel count) of each of a bone B1 (length L1), a bone B51 (length L21), a bone B61 (length L31), and bone B71 (length L41), or a bone B1 (length L1), a bone B52 (length L22), a bone B62 (length L32), and a bone B72 (length L42) out of bones in FIG. 24 from an image in which the skeletal structure is detected. The length of each bone can be found from coordinates of each keypoint in the two-dimensional image. A value acquired by multiplying a correction constant by L1+L21+L31+L41 or L1+L22+L32+L42 being the total of the lengths is computed as a height pixel count (h). When both values can be computed, for example, the larger value is set as the height pixel count. Specifically, the length of each bone in an image is longest when an image of the bone is captured from the front, and the length is displayed shorter when the bone is inclined in a depth direction relative to the camera. Accordingly, an image of a longer bone is considered more likely to be captured from the front and be closer to the true value. Therefore, it is preferable to select the larger value.

Figure 25:
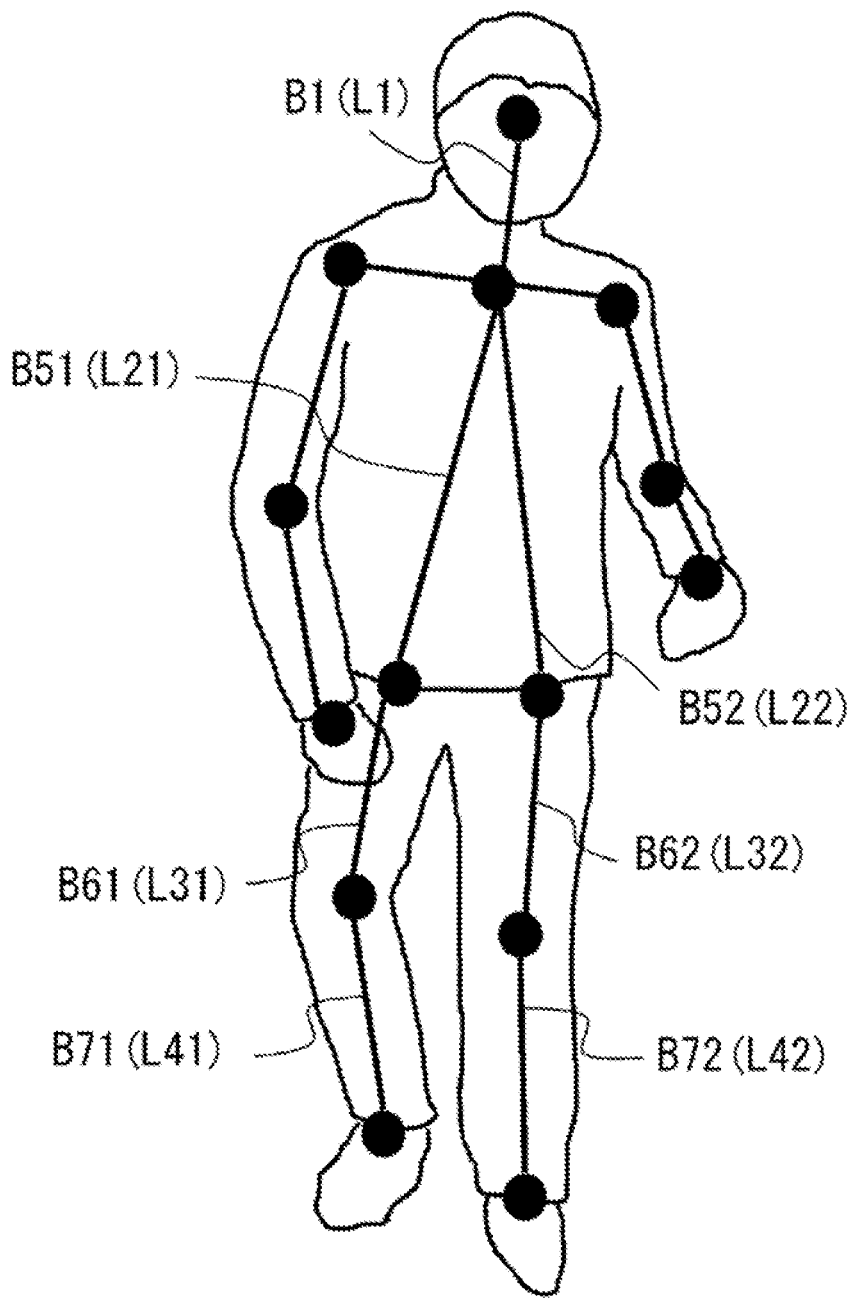
FIG. 25 is a diagram illustrating a detection example of a skeletal structure according to the example embodiment 2.

In an example in FIG. 25, a bone B1, a bone B51 and a bone B52, a bone B61 and a bone B62, and a bone B71 and a bone B72 are detected without overlapping each other. L1+L21+L31+L41 and L1+L22+L32+L42 being the totals of the bones are found, and, for example, a value acquired by multiplying a correction constant by L1+L22+L32+L42 on the left foot side being a longer length of the detected bones is set to be a height pixel count.

Figure 26:
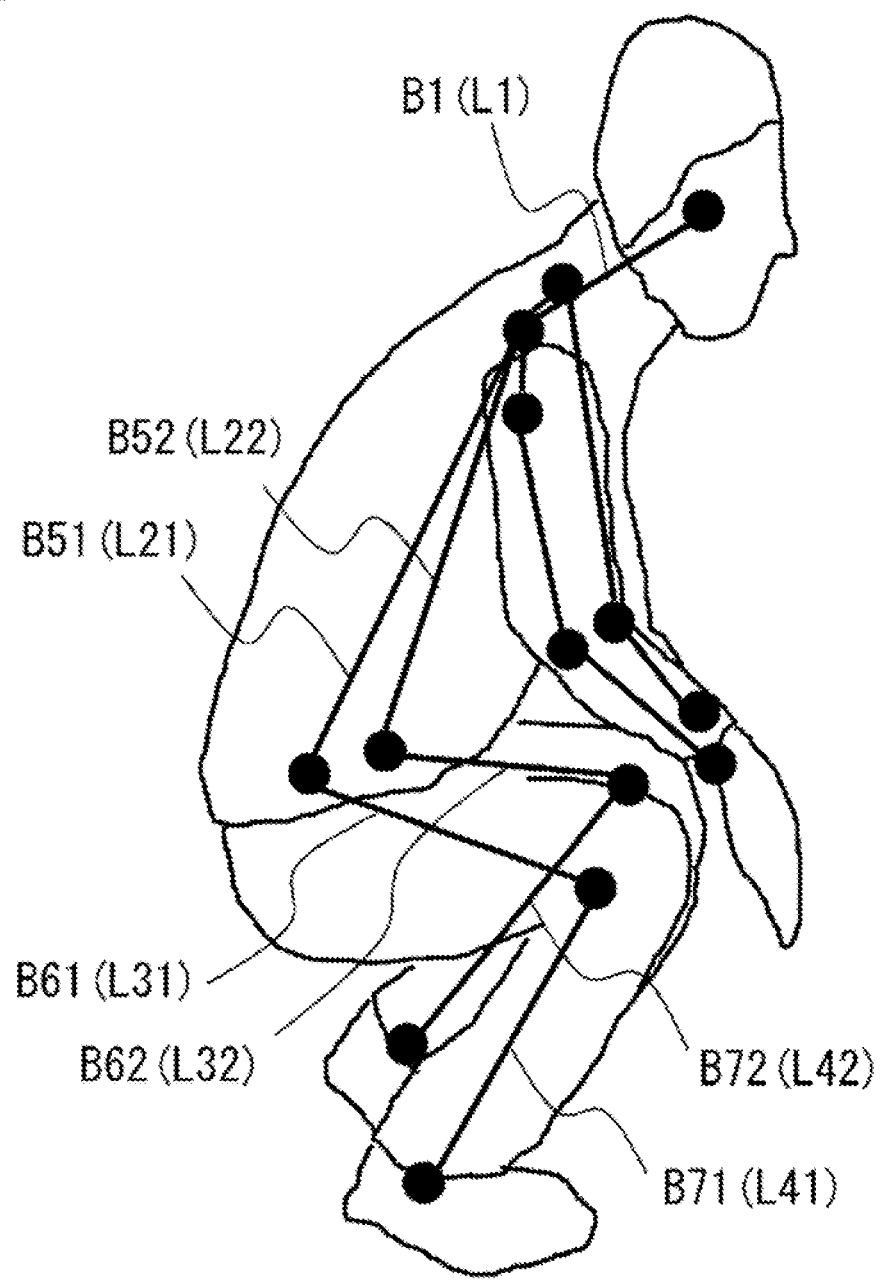
FIG. 26 is a diagram illustrating a detection example of a skeletal structure according to the example embodiment 2.

In an example in FIG. 26, a bone B1, a bone B51 and a bone B52, a bone B61 and a bone B62, and a bone B71 and a bone B72 are detected, and the bone B61 and the bone B71 in the right leg and the bone B62 and the bone B72 in the left leg overlap each other. L1+L21+L31+L41 and L1+L22+L32+L42 being the totals of the bones are found, and for example, a value acquired by multiplying a correction constant by L1+L21+L31+L41 on the right foot side being a longer length of the detected bones is set to be a height pixel count.

Figure 27:
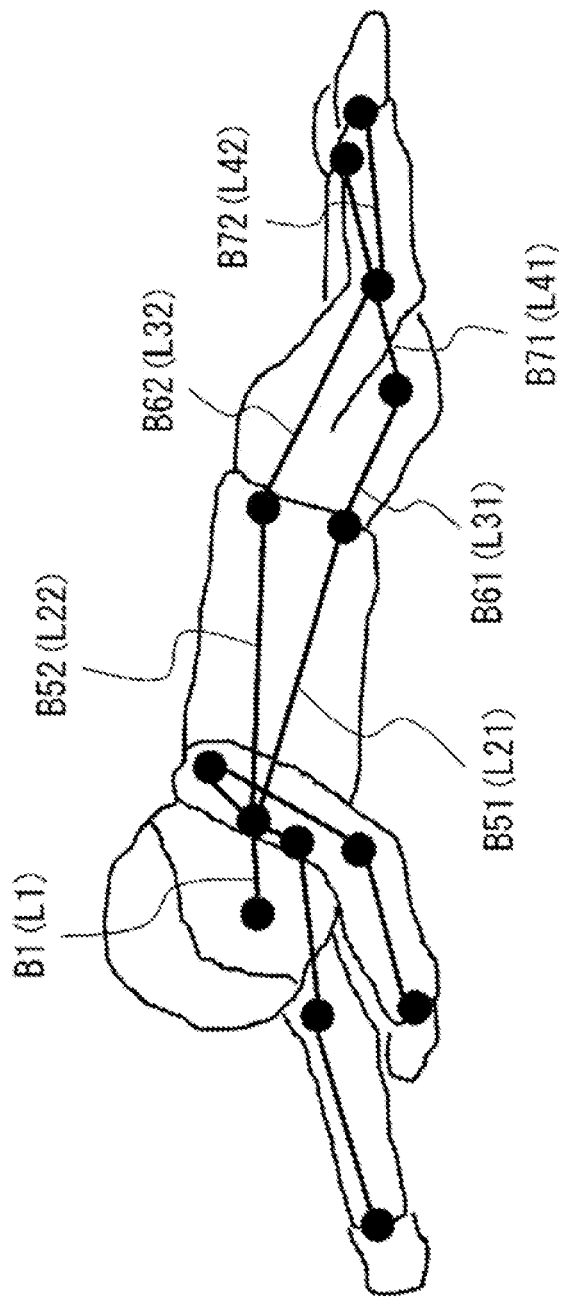
FIG. 27 is a diagram illustrating a detection example of a skeletal structure according to the example embodiment 2.

In an example in FIG. 27, a bone B1, a bone B51 and a bone B52, a bone B61 and a bone B62, and a bone B71 and a bone B72 are detected, and the bone B61 and the bone B71 in the right leg and the bone B62 and the bone B72 in the left leg overlap each other. L1+L21+L31+L41 and L1+L22+L32+L42 being the totals of the bones are found, and for example, a value acquired by multiplying a correction constant by L1+L22+L32+L42 on the left foot side being a longer length of the detected bones is set to be a height pixel count.

In the specific example 1, since the height can be found by totaling the lengths of bones from the head to the foot, the height pixel count can be found by a simple method. Further, since at least a skeleton from the head to the foot has only to be detected by a skeleton estimation technology using machine learning, a height pixel count can be precisely estimated even in a case of an entire person not necessarily being captured in an image such as a squatting state.

Specific Example 2

In the specific example 2, a height pixel count is found by using a two-dimensional skeleton model indicating a relation between the length of a bone included in a two-dimensional skeletal structure and the length of the whole body of a person in a two-dimensional image space.

Figure 28:
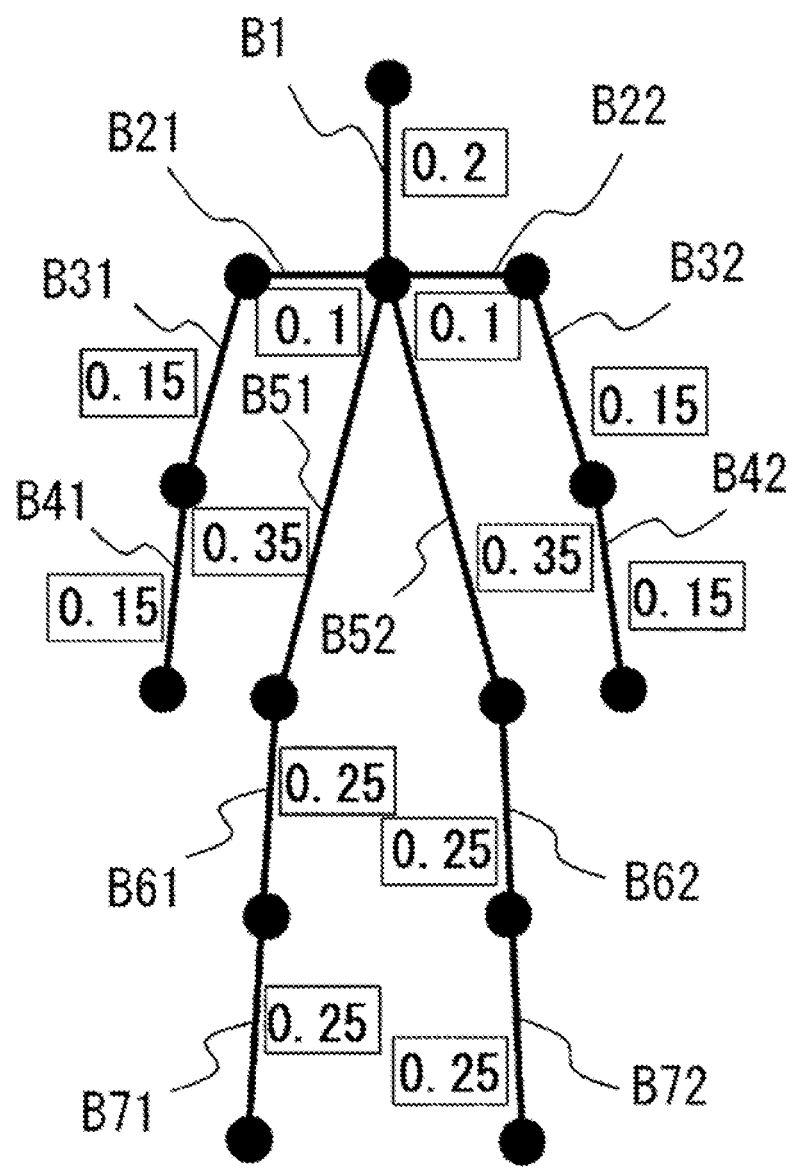
FIG. 28 is a diagram illustrating a human-body model according to the example embodiment 2.

FIG. 28 is a human-body model (two-dimensional skeleton model) 301 being used in the specific example 2 and indicating a relation between the length of each bone in a two-dimensional image space and the length of the whole body in the two-dimensional image space. As illustrated in FIG. 28, a relation between the length of each bone and the length of the whole body (the ratio of the length of each bone to the length of the whole body) of an average person is associated with the bone in the human-body model 301. For example, the length of a bone B1 of the head is the length of the whole body×0.2 (20%), the length of a bone B41 of the right arm is the length of the whole body×0.15 (15%), and the length of a bone B71 of the right leg is the length of the whole body×0.25 (25%). By storing information about such a human-body model 301 in the database 110, an average length of the whole body can be found from the length of each bone. In addition to a human-body model of an average person, a human-body model may be prepared for each attribute of a person, such as age, gender, and nationality. Thus, the length of the whole body (height) can be suitably found based on an attribute of a person.

Figure 29:
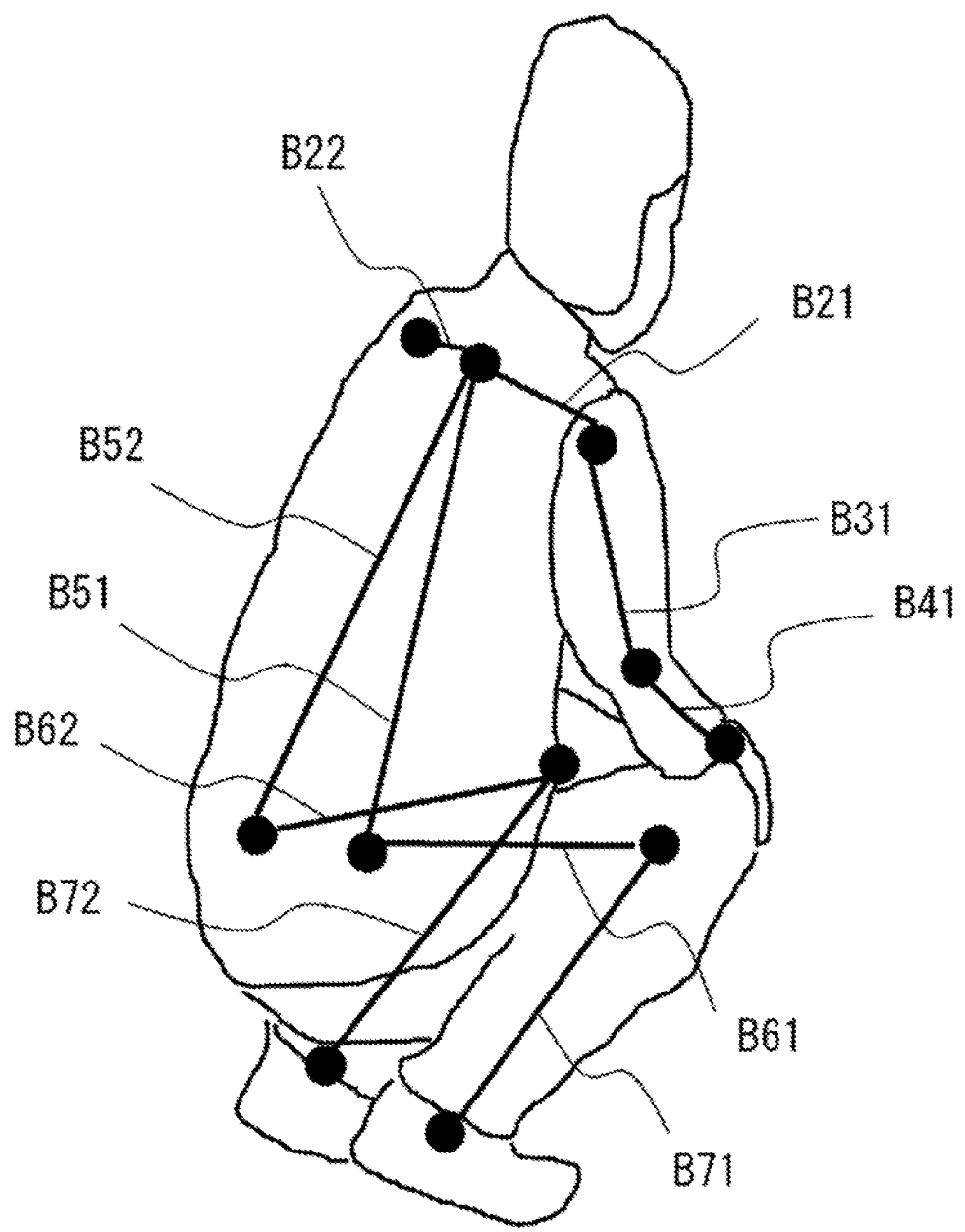
FIG. 29 is a diagram illustrating a detection example of a skeletal structure according to the example embodiment 2.

In the specific example 2, the height computation unit 108 acquires the length of each bone, as described in FIG. 21 (S221). The height computation unit 108 acquires the length (the length in the two-dimensional image space) of every bone in the detected skeletal structure. FIG. 29 is an example of capturing an image of a person in a squatting state from the diagonally right rear and detecting a skeletal structure. Since the face and the left side of the person is not captured, a bone of the head and bones of the left arm and the left hand are not detected in this example. Therefore, the lengths of detected bones B21, B22, B31, B41, B51, B52, B61, B62, B71, and B72 are acquired.

Next, the height computation unit 108 computes a height pixel count from the length of each bone, based on the human-body model, as described in FIG. 21 (S222). The height computation unit 108 refers to the human-body model 301 indicating a relation between the lengths of each bone and the whole body as illustrated in FIG. 28 and finds the height pixel count from the length of each bone. For example, since the length of the bone B41 of the right arm is the length of the whole body×0.15, a height pixel count based on the bone B41 is found by the length of the bone B41/0.15. Further, since the length of the bone B71 of the right leg is the length of the whole body×0.25, a height pixel count based on the bone B71 is found by the length of the bone B71/0.25.

The human-body model referred to at this time is, for example, a human-body model of an average person; however, a human-body model may be selected based on an attribute of a person, such as age, gender, and nationality. For example, when the face of a person is captured in a captured image, an attribute of the person is identified based on the face, and a human-body model related to the identified attribute is referred to. An attribute of a person can be recognized from a feature of a face in an image by referring to information acquired by machine learning of a face for each attribute. Further, when an attribute of a person cannot be identified from an image, a human-body model of an average person may be used.

Further, a height pixel count computed from the lengths of bones may be corrected by a camera parameter. For example, when a camera is placed at a high position and captures an image in such a way as to overlook a person, the lateral length of a bone of the shoulder width and the like is not affected by the depression angle of the camera in a two-dimensional skeletal structure, whereas the longitudinal length of a bone of the neck-hip and the like decreases as the depression angle increases. Then, a height pixel count computed from the lateral length of the bone of the shoulder width or the like tends to be higher than actual. Then utilization of a camera parameter allows recognition of an angle at which the person is overlooked by the camera, and therefore, by using information about the depression angle, the two-dimensional skeletal structure can be corrected to a two-dimensional skeletal structure an image of which appears to be captured from the front. Thus, a height pixel count can be more accurately computed.

Figure 30:
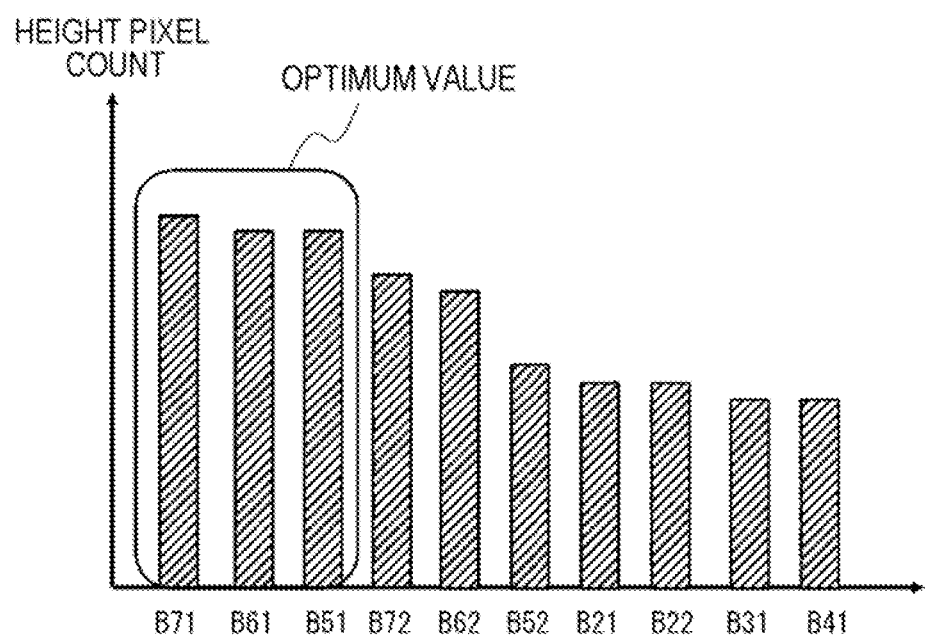
FIG. 30 is a histogram for illustrating a height pixel count computation method according to the example embodiment 2.

Next, the height computation unit 108 computes an optimum value of a height pixel count, as described in FIG. 21 (S223). The height computation unit 108 computes an optimum value of a height pixel count from a height pixel count found for each bone. For example, a histogram of height pixel counts found for respective bones as illustrated in FIG. 30 is generated, and high height pixel counts are selected out of the counts. In other words, height pixel counts longer than others are selected out of a plurality of height pixel counts found based on a plurality of bones. For example, top 30% are set to be valid values, and height pixel counts based on bones B71, B61, and B51 are selected in FIG. 30. The average of the selected height pixel counts may be found as an optimum value, or the highest height pixel count may be set as an optimum value. Since the height is found from the length of a bone in a two-dimensional image, when an image of the bone is not captured from the front, in other words, when the image of the bone is captured in such a way that the bone is inclined in a depth direction viewed from the camera, the length of the bone becomes shorter compared with a case of an image of the bone being captured from the front. Then, the possibility of an image captured from the front becomes higher with a larger height pixel count value than a smaller height pixel count value, and the larger value becomes a more likely value; and therefore the larger value is set to be an optimum value.

In the specific example 2, a height pixel count is found based on bones of a detected skeletal structure by using a human-body model indicating a relation between the lengths of a bone and the whole body in a two-dimensional image space, and therefore even when the entire skeleton from the head to the foot is not acquired, a height pixel count can be found from part of the bones. Employment of a larger value out of values found from a plurality of bones particularly enables precise estimation of a height pixel count.

Specific Example 3

In the specific example 3, a two-dimensional skeletal structure is fitted to a three-dimensional human-body model (three-dimensional skeleton model) and a skeleton vector of the whole body is found by using a height pixel count of the fitted three-dimensional human-body model.

In the specific example 3, the height computation unit 108 first computes a camera parameter, based on an image captured by the camera 200, as described in FIG. 22 (S231). The height computation unit 108 extracts an object the length of which is previously known from a plurality of images captured by the camera 200 and finds a camera parameter from the size (pixel count) of the extracted object. Note that a camera parameter may be previously found and the found camera parameter may be acquired as needed.

Next, the height computation unit 108 adjusts the placement and the height of the three-dimensional human-body model (S232). The height computation unit 108 prepares a three-dimensional human-body model for height pixel count computation for a detected two-dimensional skeletal structure and places the model in the same two-dimensional image, based on the camera parameter. Specifically, the height computation unit 108 determines "a relative positional relation between the camera and a person in the real world" from the camera parameter and the two-dimensional skeletal structure. For example, assuming the position of the camera to be coordinates (0, 0, 0), the height computation unit 108 determines coordinates (x, y, z) of the position where a person is standing (or sitting). Then, the height computation unit 108 superposes the three-dimensional human-body model on the two-dimensional skeletal structure by assuming an image captured when the three-dimensional human-body model is placed at the same position (x, y, z) as the determined person.

Figure 31:
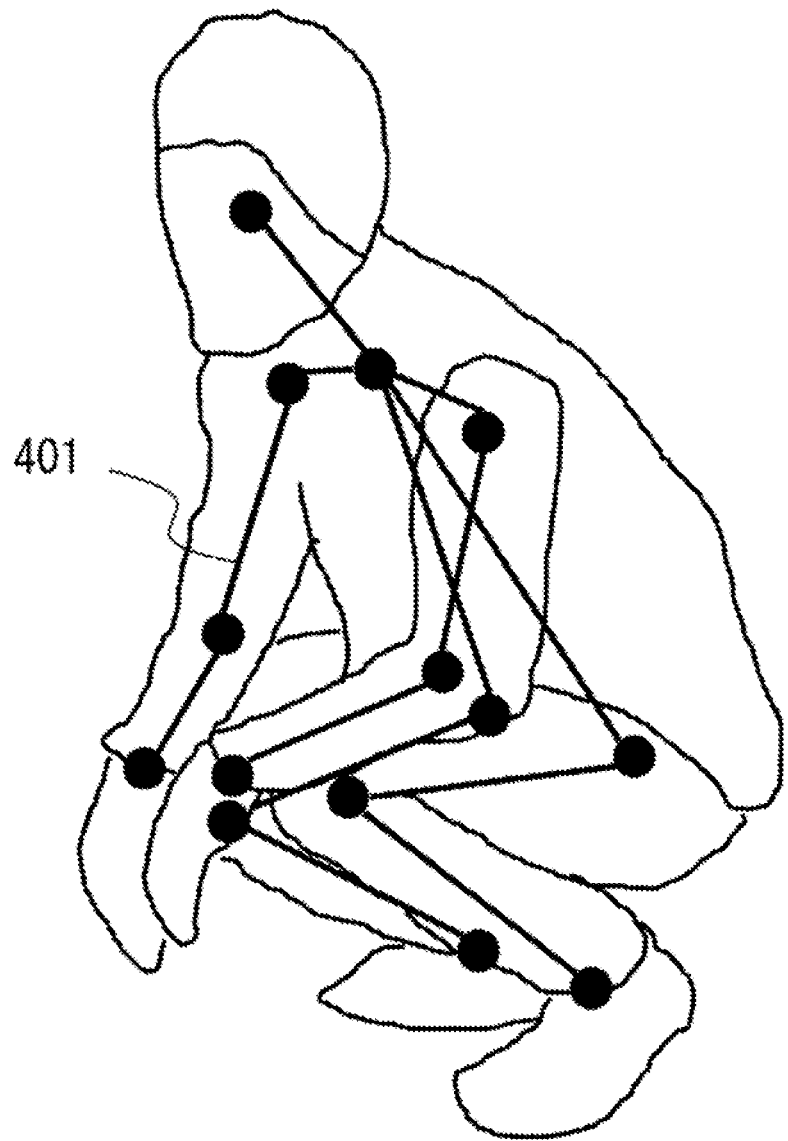
FIG. 31 is a diagram illustrating a detection example of a skeletal structure according to the example embodiment 2.
Figure 32:
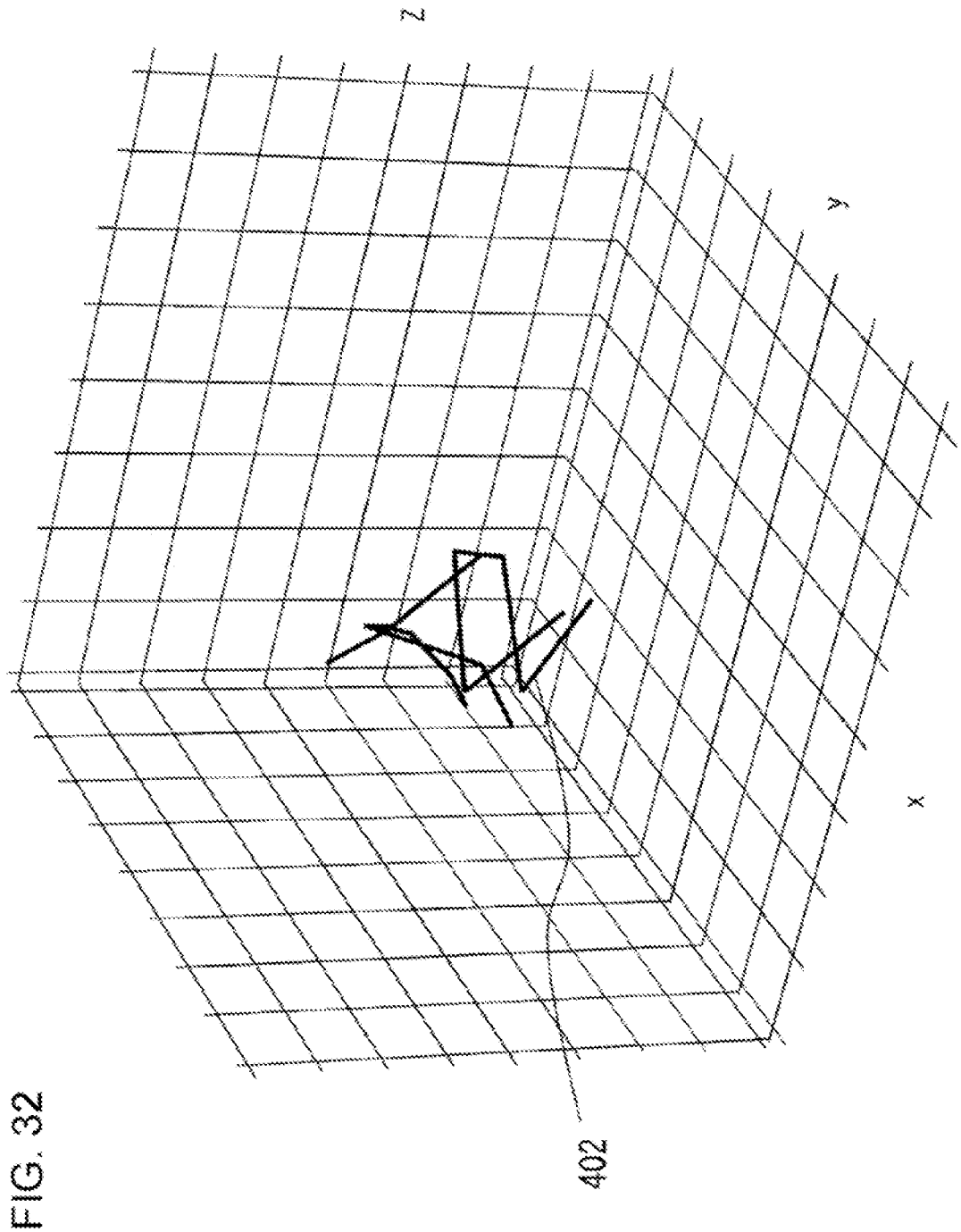
FIG. 32 is a diagram illustrating a three-dimensional human-body model according to the example embodiment 2.
Figure 33:
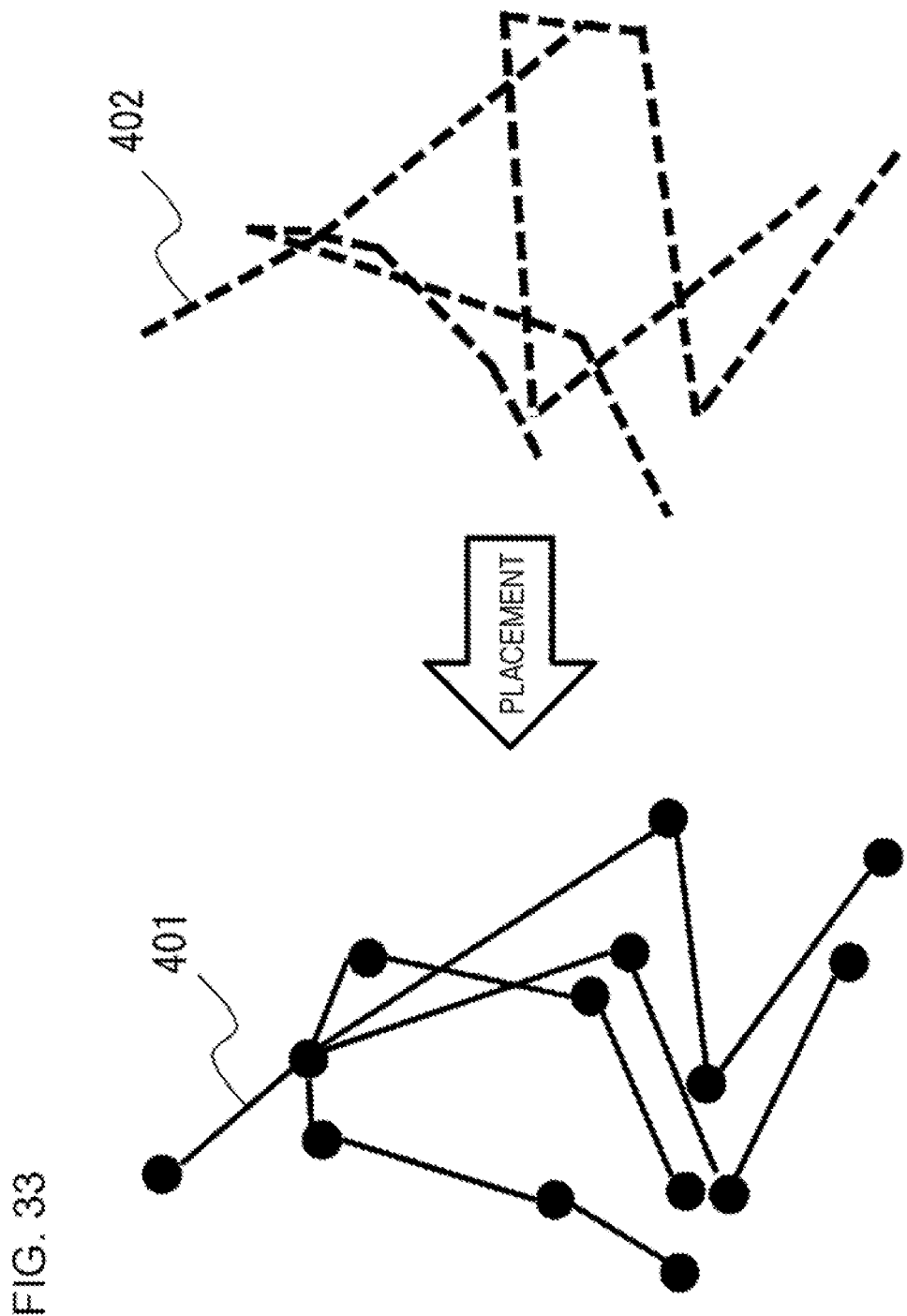
FIG. 33 is a diagram for illustrating the height pixel count computation method according to the example embodiment 2.

FIG. 31 is an example of capturing an image of a squatting person from the diagonally left front and detecting a two-dimensional skeletal structure 401. The two-dimensional skeletal structure 401 includes two-dimensional coordinate information. Note that while all bones are preferably detected, part of the bones may not be detected. A three-dimensional human-body model 402 as illustrated in FIG. 32 is prepared for the two-dimensional skeletal structure 401. The three-dimensional human-body model (three-dimensional skeleton model) 402 includes three-dimensional coordinate information and is a model of a skeleton the shape of which is the same as the two-dimensional skeletal structure 401. Then, the prepared three-dimensional human-body model 402 is placed and superposed on the detected two-dimensional skeletal structure 401, as illustrated in FIG. 33. Further, in addition to superposition, the height of the three-dimensional human-body model 402 is adjusted in such a way as to match the height of the two-dimensional skeletal structure 401.

Note that the three-dimensional human-body model 402 prepared at this time may be a model in a state close to the pose of the two-dimensional skeletal structure 401 as illustrated in FIG. 33 or may be a model in a state of standing upright. For example, a three-dimensional human-body model 402 in an estimated pose may be generated by using a technology for estimating a pose in a three-dimensional space from a two-dimensional image by using machine learning. By learning of information about a joint in a two-dimensional image and a joint in a three-dimensional space, a three-dimensional pose can be estimated from the two-dimensional image.

Figure 34:
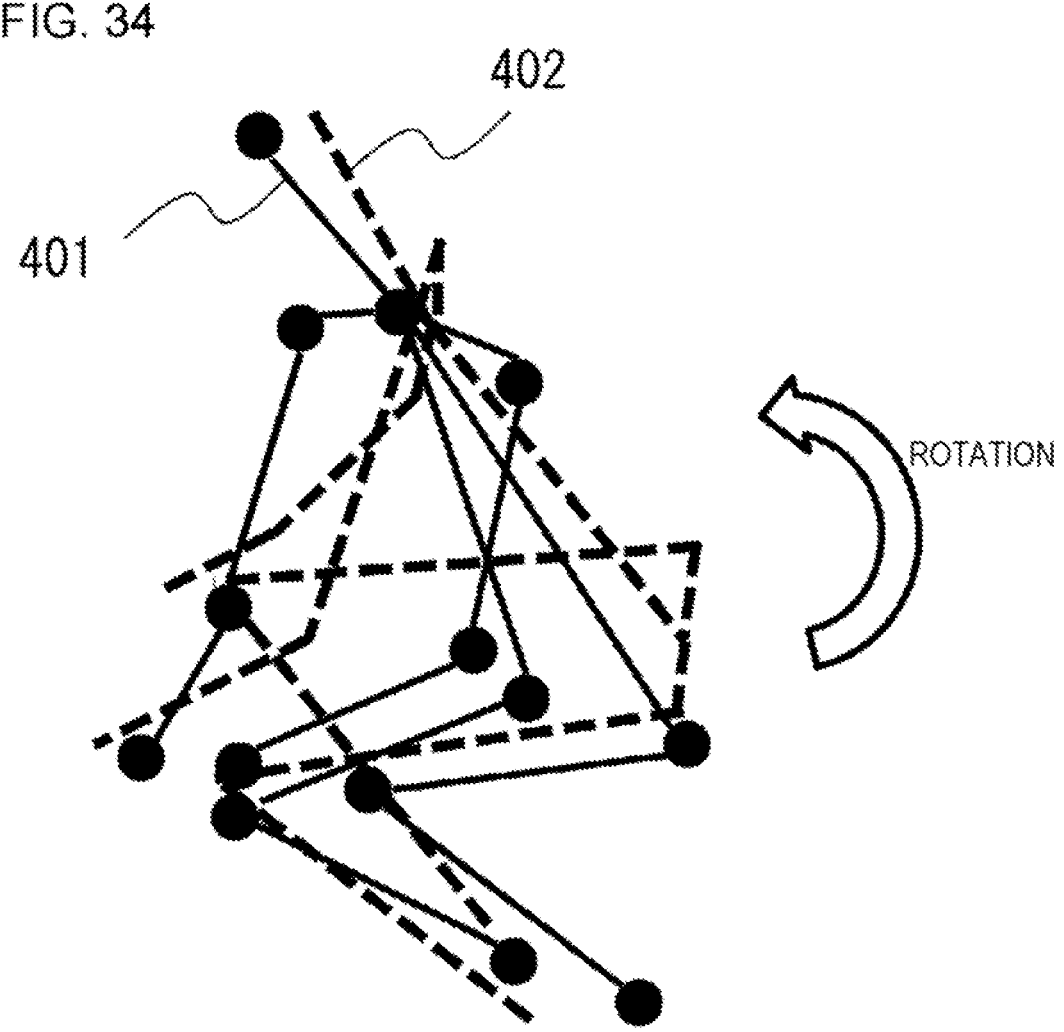
FIG. 34 is a diagram for illustrating the height pixel count computation method according to the example embodiment 2.

Next, the height computation unit 108 fits the three-dimensional human-body model to the two-dimensional skeletal structure, as described in FIG. 22 (S233). The height computation unit 108 transforms the three-dimensional human-body model 402 in such a way that the poses of the three-dimensional human-body model 402 and the two-dimensional skeletal structure 401 match in a state of the three-dimensional human-body model 402 being superposed on the two-dimensional skeletal structure 401, as illustrated in FIG. 34. Specifically, the height computation unit 108 performs optimization in such a way as to eliminate the difference between the three-dimensional human-body model 402 and the two-dimensional skeletal structure 401 by adjusting the height, the orientation of the body, and the angles of joints in the three-dimensional human-body model 402. For example, the height computation unit 108 rotates a joint in the three-dimensional human-body model 402 within a movable range of a person, rotates the entire three-dimensional human-body model 402, and adjusts the entire size. Note that the fitting of the three-dimensional human-body model to the two-dimensional skeletal structure is performed in a two-dimensional space (two-dimensional coordinates). Specifically, the height computation unit 108 maps the three-dimensional human-body model onto the two-dimensional space and optimizes the three-dimensional human-body model for the two-dimensional skeletal structure in consideration of how the transformed three-dimensional human-body model changes in the two-dimensional space (image).

Figure 35:
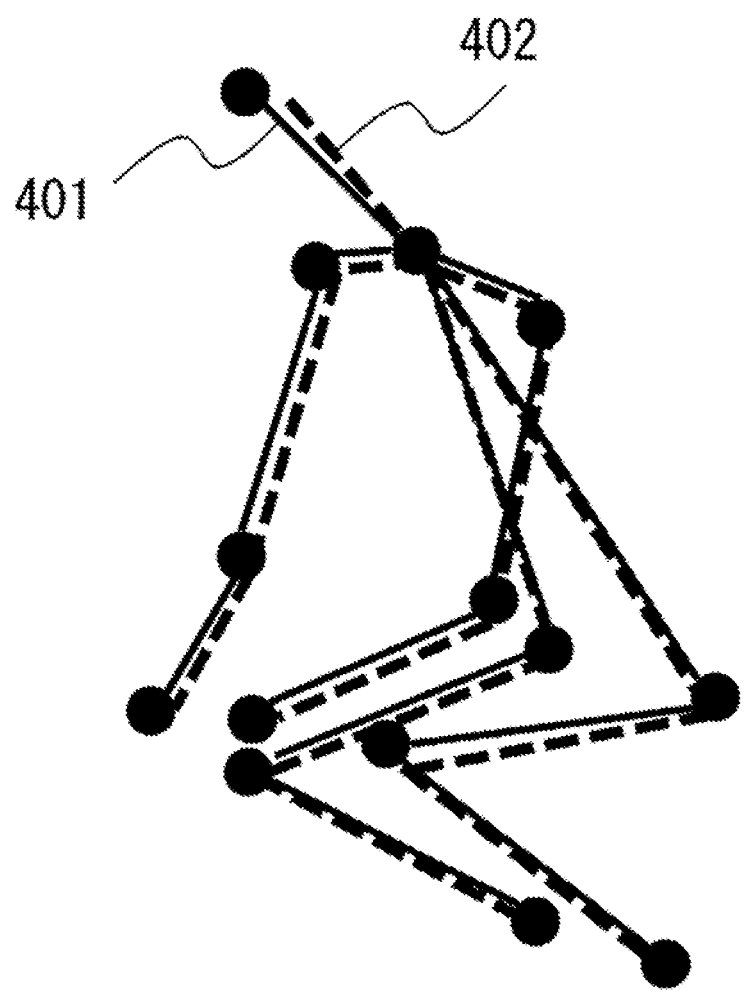
FIG. 35 is a diagram for illustrating the height pixel count computation method according to the example embodiment 2.

Next, the height computation unit 108 computes a height pixel count of the fitted three-dimensional human-body model, as described in FIG. 22 (S234). When the difference between the three-dimensional human-body model 402 and the two-dimensional skeletal structure 401 is eliminated and the poses match as illustrated in FIG. 35, the height computation unit 108 finds a height pixel count of the three-dimensional human-body model 402 in the state. The height computation unit 108 finds the length of the whole body in the two-dimensional space assuming the optimized three-dimensional human-body model 402 to be in a state of standing upright, based on the camera parameter. For example, the height computation unit 108 computes a height pixel count, based on the lengths (pixel counts) of bones from the head to the foot when the three-dimensional human-body model 402 is caused to stand upright. The lengths of the bones from the head to the foot in the three-dimensional human-body model 402 may be totaled, similarly to the specific example 1.

In the specific example 3, by fitting a three-dimensional human-body model to a two-dimensional skeletal structure, based on a camera parameter, and finding a height pixel count, based on the three-dimensional human-body model, a height pixel count can be precisely estimated even when all bones are not captured at the front, in other words, when a large error is caused by all bones being captured aslant.

Normalization Processing

As illustrated in FIG. 19, the image processing apparatus 100 performs the normalization processing (S202) subsequently to the height pixel count computation processing. In the normalization processing, the feature value computation unit 103 computes a keypoint height, as described in FIG. 23 (S241). The feature value computation unit 103 computes a keypoint height (pixel count) of every keypoint included in a detected skeletal structure. A keypoint height is the length (pixel count) in a height direction from the lowest end (such as a keypoint of either foot) of the skeletal structure to the keypoint. As an example, a keypoint height is found from the Y-coordinate of a keypoint in an image. Note that, as described above, a keypoint height may be found from the length in a direction along a vertical projection axis based on a camera parameter. For example, in the example in FIG. 24, the height (yi) of a keypoint A2 of the neck is a value acquired by subtracting the Y-coordinate of a keypoint A81 of the right foot or a keypoint A82 of the left foot from the Y-coordinate of the keypoint A2.

Next, the feature value computation unit 103 determines a reference point for normalization (S242). A reference point is a point being a reference for representing a relative height of a keypoint. A reference point may be preset or may be selected by a user. A reference point is preferably at the center of a skeletal structure or above the center (being above in a vertical direction of an image), and for example, coordinates of a keypoint of the neck is set to be a reference point. Note that coordinates of another keypoint such as the head may be set to be a reference point without being limited to the neck. Any coordinates (such as central coordinates of a skeletal structure) may be set to be a reference point without being limited to a keypoint.

Next, the feature value computation unit 103 normalizes a keypoint height (yi) by the height pixel count (S243). The feature value computation unit 103 normalizes each keypoint by using the keypoint height of each keypoint, the reference point, and the height pixel count. Specifically, the feature value computation unit 103 normalizes a relative height of a keypoint relative to the reference point by the height pixel count. As an example of focusing only on the height direction, only the Y-coordinate is extracted, and normalization is performed with a keypoint of the neck as the reference point. Specifically, denoting the Y-coordinate of the reference point (the keypoint of the neck) by (yc), a feature value (normalized value) is found by using the following equation (1). Note that when a vertical projection axis based on a camera parameter is used, (yi) and (yc) are converted into values in a direction along the vertical projection axis.

Math. 1

$$f_i = (y_i - y_c)/h \quad (1)$$

For example, when there are 18 keypoints, 18 coordinates (x0, y0), (x1, y1), . . . , (x17, y17) of the keypoints are converted into an 18-dimensional feature value as follows by using the aforementioned equation (1).

Math. 2

$$\begin{aligned}f_0 &= (y_0 - y_c)/h \\ f_1 &= (y_1 - y_c)/h \\ &\vdots \\ f_{17} &= (y_{17} - y_c)/h\end{aligned} \quad (2)$$

Figure 36:
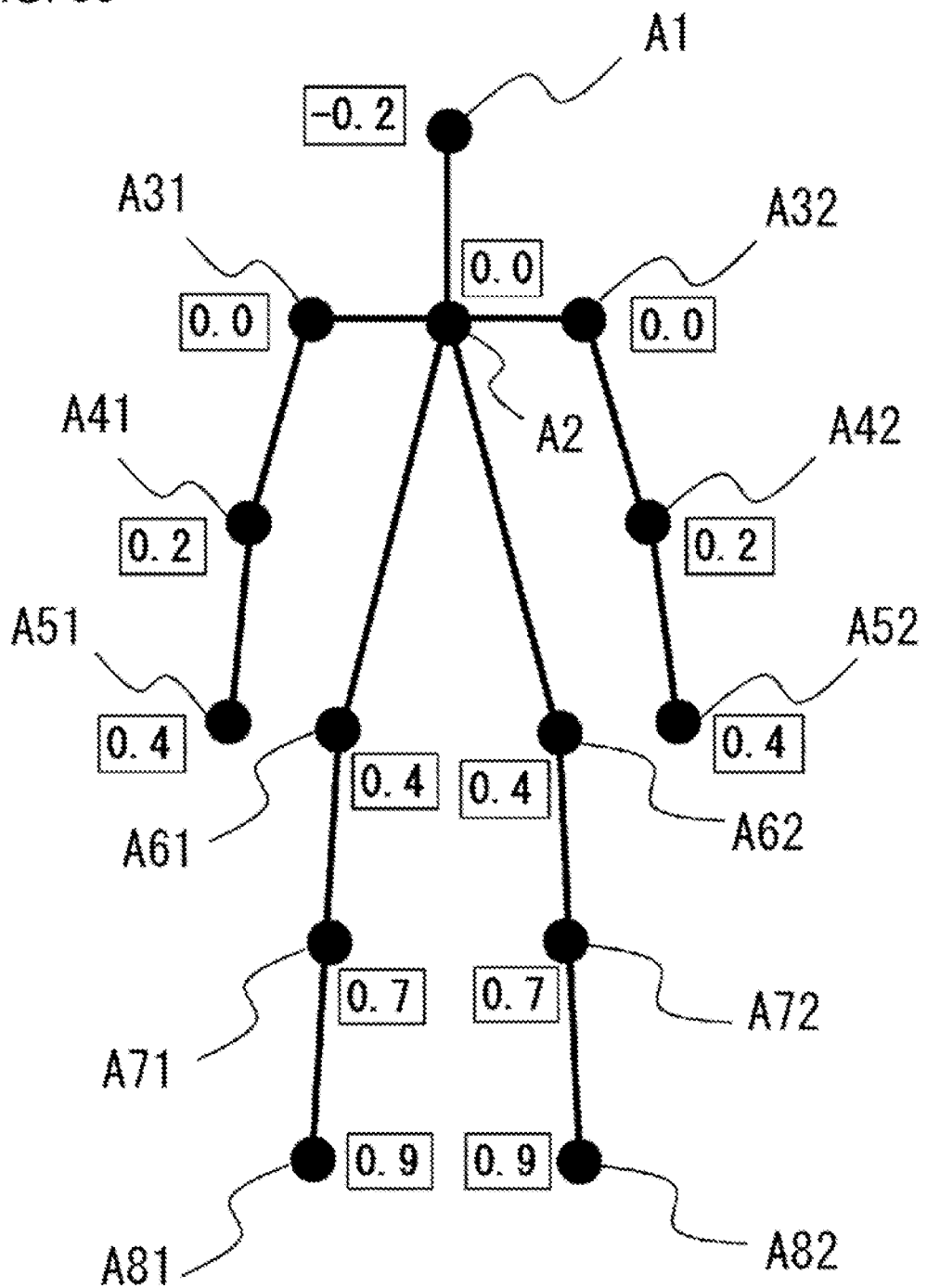
FIG. 36 is a diagram for illustrating the normalization method according to the example embodiment 2.
Figure 37:
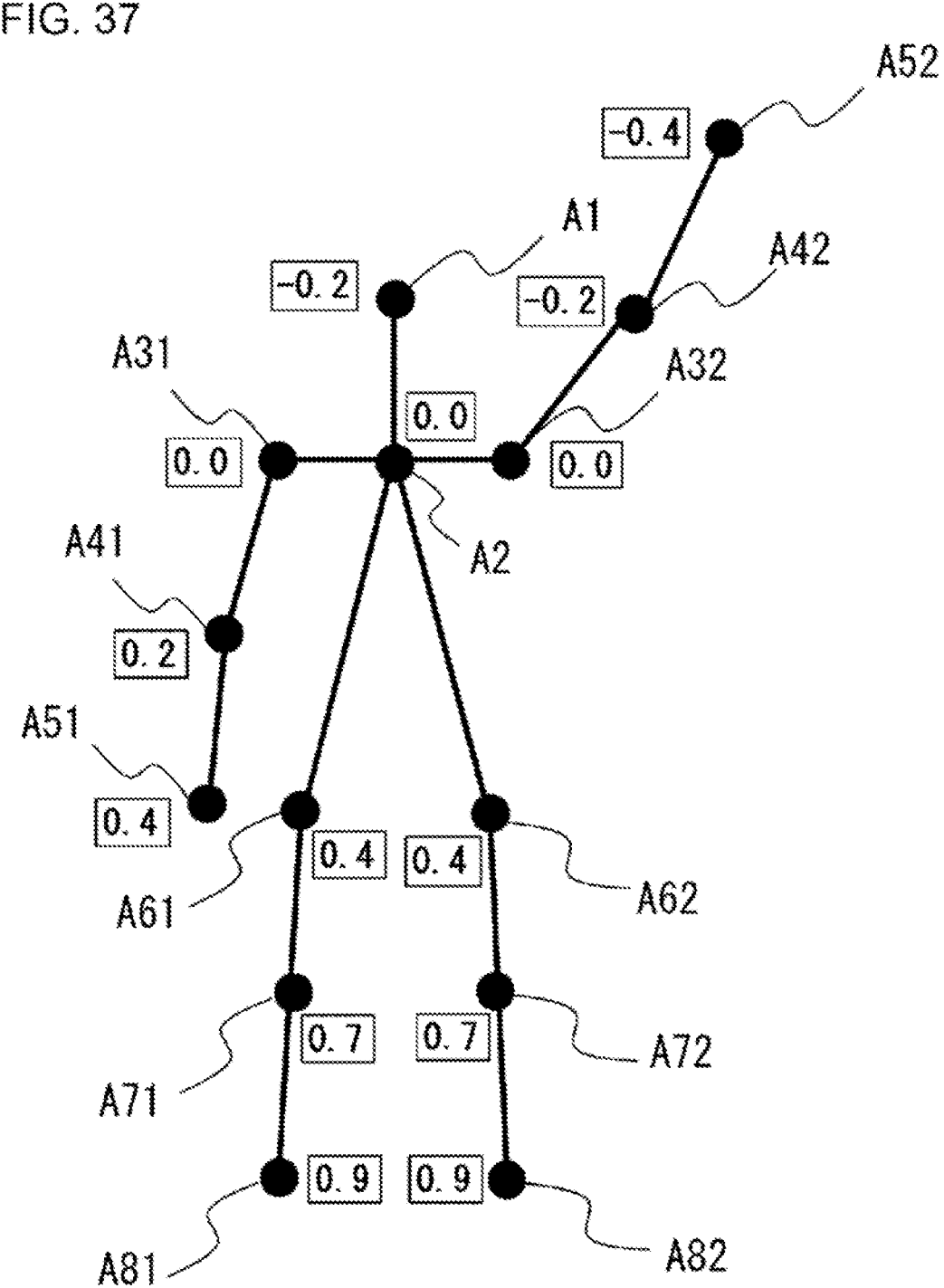
FIG. 37 is a diagram for illustrating the normalization method according to the example embodiment 2.
Figure 38:
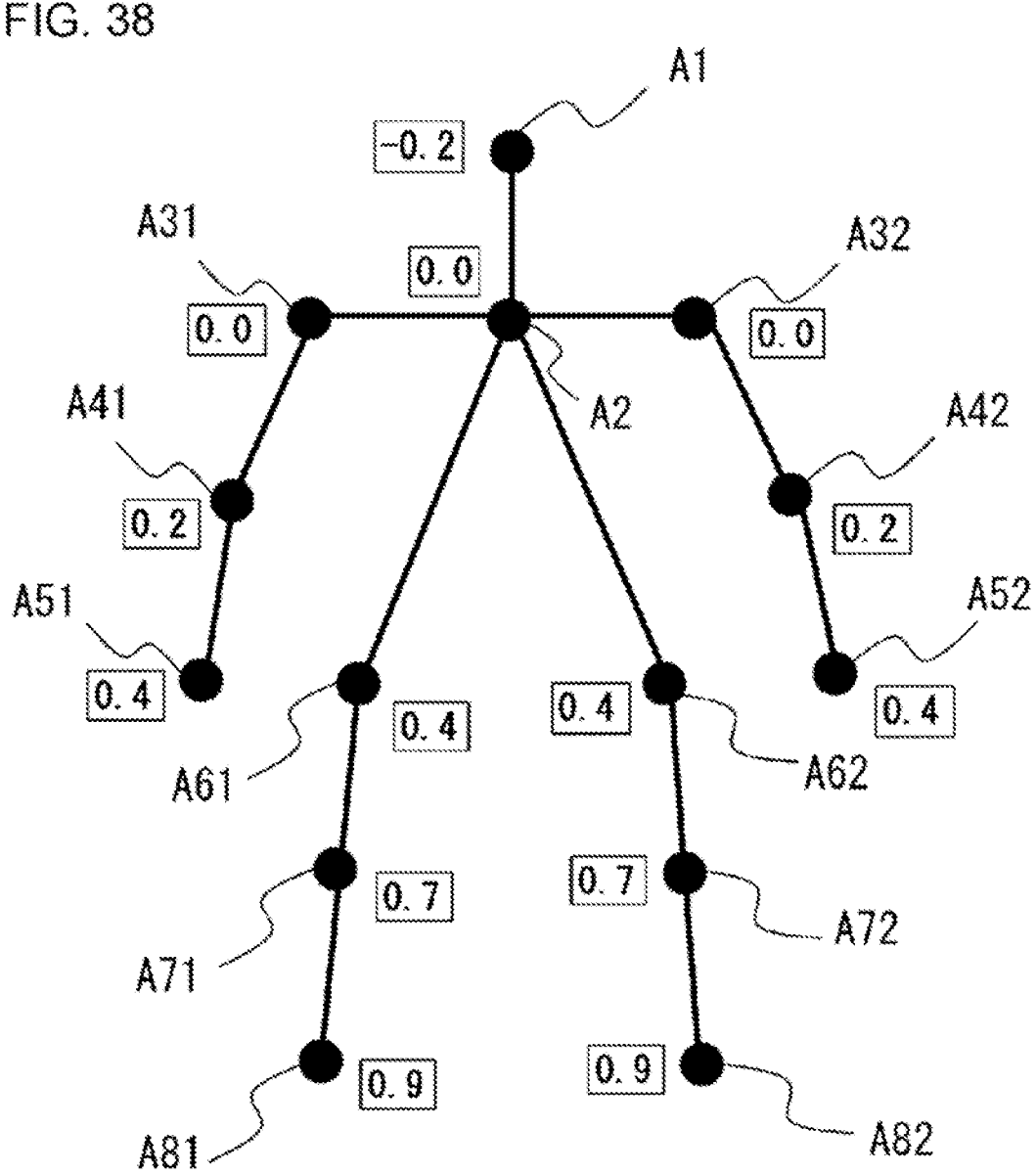
FIG. 38 is a diagram for illustrating the normalization method according to the example embodiment 2.

FIG. 36 illustrates an example of a feature value of each keypoint found by the feature value computation unit 103. Since a keypoint A2 of the neck is set to be a reference point in this example, a feature value of the keypoint A2 is 0.0, and feature values of a keypoint A31 of the right shoulder and a keypoint A32 of the left shoulder that are at the same height as the neck are also 0.0. A feature value of a keypoint A1 of the head being above the neck is −0.2. Feature values of a keypoint A51 of the right hand and a keypoint A52 of the left hand that are below the neck are 0.4, and feature values of a keypoint A81 of the right foot and a keypoint A82 of the left foot are 0.9. When the person raises the left hand in this state, the left hand is above the reference point as illustrated in FIG. 37, and therefore the feature value of the keypoint A52 of the left hand becomes −0.4. On the other hand, normalization is performed by using only the Y-axis coordinate, and therefore the feature values do not change even when the width of the skeletal structure changes relative to FIG. 36 as illustrated in FIG. 38. In other words, a feature value (normalized value) according to the present example embodiment indicates a feature of a skeletal structure (keypoint) in a height direction (Y-direction) and is not affected by a change in a lateral direction (X-direction) of the skeletal structure.

As described above, according to the present example embodiment, a skeletal structure of a person is detected from a two-dimensional image, and by using a height pixel count (a height when the person is standing upright in a two-dimensional image space) found from the detected skeletal structure, each keypoint in the skeletal structure is normalized. Use of the normalized feature value enables improvement in robustness when classification, retrieval, and the like are performed. Specifically, a feature value according to the present example embodiment is not affected by a change in a lateral direction of a person, as described above, and therefore high robustness to changes in the orientation of the person and the body shape of the person is provided.

Furthermore, according to the present example embodiment, detection of a skeletal structure of a person can be provided by using a skeleton estimation technology such as OpenPose, and therefore learning data for learning of a pose and the like of a person does not need to be prepared. Further, normalization of a keypoint of a skeletal structure and storage of the normalized keypoint into a database enable classification and retrieval of a pose and the like of a person, and therefore classification and retrieval can be also performed on an unknown pose. Further, normalization of a keypoint of a skeletal structure enables acquisition of a clear and straightforward feature value, and therefore a processing result is convincing to a user unlike a black-box type algorithm such as machine learning.

While the example embodiments of the present invention have been described above with reference to the drawings, the example embodiments are exemplifications of the present invention, and various configurations other than those described above may be employed.

Further, while a plurality of processes (processing) are described in a sequential order in each of a plurality of flowcharts used in the aforementioned description, the execution order of processes executed in each example embodiment is not limited to the order of description. The order of the illustrated processes may be modified without affecting the contents in each example embodiment. Further, the aforementioned example embodiments may be combined without contradicting one another.

The whole or part of the example embodiments disclosed above may also be described as, but not limited to, the following supplementary notes.

1. An image processing apparatus including:
   an image acquisition unit that acquires a candidate of a query image;
   a skeletal structure detection unit that detects a two-dimensional skeletal structure of a person included in a candidate of the query image;
   a query evaluation unit that computes an evaluation value of a candidate of the query image, based on a detection result of the two-dimensional skeletal structure;
   a selection unit that selects a query image out of one or a plurality of candidates of the query image, based on the evaluation value;
   a feature value computation unit that computes a feature value of the two-dimensional skeletal structure detected from the query image; and
   a retrieval unit that retrieves an analysis target image including a person in a pose similar to a pose of a person included in the query image out of one or a plurality of the analysis target images, based on a degree of similarity of the computed feature value.

2. The image processing apparatus according to 1, wherein the selection unit
   outputs the evaluation value of a candidate of the query image,
   accepts a user input for specifying the query image out of one or a plurality of candidates of the query image, and
   selects a candidate of the query image specified by the user input as the query image.

3. The image processing apparatus according to 2, wherein the image acquisition unit acquires candidates of a plurality of the query images, and
   the selection unit
   outputs the evaluation values of candidates of a plurality of the query images in such a way that the values are comparable,
   accepts a user input for specifying one or a plurality of the query images out of candidates of a plurality of the query images, and
   selects candidates of one or a plurality of the query images specified by the user input as the query images.

4. The image processing apparatus according to 1, wherein the selection unit selects a candidate of the query image the evaluation value of which satisfies a criterion as the query image.

5. The image processing apparatus according to any one of 1 to 4, wherein
   the skeletal structure detection unit extracts a plurality of keypoints of a body, and
   the query evaluation unit computes the evaluation value, based on at least one of a number of the extracted keypoints and a confidence level of each of the extracted keypoints.

6. The image processing apparatus according to 5, wherein the query evaluation unit computes the evaluation value, based on a weight value of each of a plurality of the keypoints set based on a user input.

7. The image processing apparatus according to 6, wherein the query evaluation unit
   determines part of the keypoints by
      processing of accepting a user input for enclosing part of a body of a person by a frame in an image indicating a body and determining the keypoint included in the frame,
      processing of accepting a user input for specifying part of the keypoints in an image indicating a body of a person and the keypoints of a body and determining the specified keypoint, or
      processing of accepting a user input for specifying part of a body of a person by a name of the part and determining the keypoint included in a specified part and
   sets the weight value of the determined keypoint, based on a user input.

8. The image processing apparatus according to any one of 1 to 7, wherein
   the query evaluation unit computes the evaluation value, based on a size of a person in an image.

9. An image processing method including, by a computer:
   acquiring a candidate of a query image;
   detecting a two-dimensional skeletal structure of a person included in a candidate of the query image;
   computing an evaluation value of a candidate of the query image, based on a detection result of the two-dimensional skeletal structure;
   selecting a query image out of one or a plurality of candidates of the query image, based on the evaluation value;
   computing a feature value of the two-dimensional skeletal structure detected from the query image; and
   retrieving an analysis target image including a person in a pose similar to a pose of a person included in the query image out of one or a plurality of the analysis target images, based on a degree of similarity of the computed feature value.

10. A program causing a computer to function as:
    an image acquisition unit that acquires a candidate of a query image;
    a skeletal structure detection unit that detects a two-dimensional skeletal structure of a person included in a candidate of the query image;
    a query evaluation unit that computes an evaluation value of a candidate of the query image, based on a detection result of the two-dimensional skeletal structure;
    a selection unit that selects a query image out of one or a plurality of candidates of the query image, based on the evaluation value;
    a feature value computation unit that computes a feature value of the two-dimensional skeletal structure detected from the query image; and
    a retrieval unit that retrieves an analysis target image including a person in a pose similar to a pose of a person included in the query image out of one or a plurality of the analysis target images, based on a degree of similarity of the computed feature value.

REFERENCE SIGNS LIST

1 Image processing system
10 Image processing apparatus
11 Skeleton detection unit
12 Feature value computation unit
13 Recognition unit
100 Image processing apparatus
101 Image acquisition unit
102 Skeletal structure detection unit
103 Feature value computation unit
104 Classification unit
105 Retrieval unit
106 Input unit
107 Display unit
108 Height computation unit
109 Query evaluation unit
110 Database
111 Selection unit
200 Camera
300, 301 Human-body model
401 Two-dimensional skeletal structure
402 Three-dimensional human-body model

What is claimed is:

1. An image processing apparatus comprising:
at least one memory storing one or more instructions; and
at least one processor configured to execute the one or more instructions to:
acquire a plurality of query image candidates;
detect, for each query image candidate, a two-dimensional skeletal structure of a person included in the each query image candidate;
compute, for each query image candidate, an evaluation value based on the two-dimensional skeletal structure of the person included in the each query image candidate, the evaluation value of each query image candidate indicating an extent to which a feature value computable from the each query image candidate is indicative of a pose of the person;
select, from among the query image candidates, a query image to be used for image search, based on the evaluation value computed for each query image candidate;
compute a feature value of the two-dimensional skeletal structure of the person included in the query image candidate selected as the query image; and
perform the image search by retrieving, from among a plurality of images, a target image including a feature value with a highest degree of similarity to the computed feature value, as a target image including a pose most similar to the pose of the person in the query image candidate selected as the query image,
wherein the evaluation value of each query image candidate is computed by calculating a height pixel count of a standing person in the each query image candidate, and normalizing the calculated height pixel count to yield the evaluation value.

2. The image processing apparatus according to claim 1, wherein the processor is further configured to execute the one or more instructions to:
output the evaluation value of each query image candidate;
accept user input specifying the query image from among the query image candidates; and
select the query image from among the query image candidates as specified by the user input.

3. The image processing apparatus according to claim 2, wherein the processor is further configured to execute the one or more instructions to:
output the evaluation value for each query image candidate in such a way that the values for the query image candidates are comparable;
accept user input specifying one or more of the query images from among the query image candidates; and
select the query one or more of the query images from among the query image candidates as specified by the user input.

4. The image processing apparatus according to claim 1, wherein
the processor is further configured to execute the one or more instructions to select, from among the query image candidates, a query image candidate that the evaluation value of which satisfies a criterion, as the query image.

5. The image processing apparatus according to claim 1, wherein the processor is further configured to execute the one or more instructions to:
extract a plurality of keypoints of a body; and
compute, for each query image candidate, the evaluation value based on at least one of a number of the extracted keypoints and a confidence level of each extracted keypoint.

6. The image processing apparatus according to claim 5, wherein
the processor is further configured to execute the one or more instructions to compute, for each query image candidate, the evaluation value based on a weight value of each keypoint that is set based on user input.

7. The image processing apparatus according to claim 6, wherein the processor is further configured to execute the one or more instructions to:
determine part of the keypoints by
accepting user input for enclosing part of the body of the person by an image frame in indicating the body and determining each keypoint included in the frame,
accepting user input for specifying the part of the keypoints in an image indicating the body of the person and the keypoints of the body and determining the specified part of the keypoints, or
accepting user input for specifying part of the body of the person by a name of the part of the body and determining the keypoints included in the specified part of the body; and
set the weight value of each keypoint of the determined part of the keypoints based on user input.

8. The image processing apparatus according to claim 1, wherein
the processor is further configured to execute the one or more instructions to compute, for each query image candidate, the evaluation value based on a size of the person in an image.

9. The image processing system according to claim 1, wherein the height pixel count is calculated by totaling lengths of bones from head to foot out of bones of the two-dimensional skeletal structure.

10. The image processing system according to claim 1, wherein the height pixel count is calculated by using a human-body model including a relationship between a length of each of a plurality of bones of the two-dimensional skeletal structure and a length of a whole body, where the length of the whole body is a height in two-dimensional image space.

11. The image processing system according to claim 1, wherein the height pixel count is calculated by fitting a three-dimensional human-body model to a two-dimensional skeletal structure.

12. An image processing method comprising, performed by a computer and comprising:
   acquiring a plurality of query image candidates;
   detecting, for each query image candidate, a two-dimensional skeletal structure of a person included in the each query image candidate;
   computing, for each query image candidate, an evaluation value, based on the two-dimensional skeletal structure of the person included in the each query image candidate, the evaluation value of each query image candidate indicating an extent to which a feature value computable from the each query image candidate is indicative of a pose of the person;
   selecting, from among the query image candidates, a query image to be used for image search, based on the evaluation value computed for each query image candidate;
   computing a feature value of the two-dimensional skeletal structure of the person included in the query image candidate selected as the query image; and
   performing the image search by retrieving, from among a plurality of images, a target image including a feature value with a highest degree of similarity to the computed feature value, as a target image including a pose most similar to the pose of the person in the query image candidate selected as the query image,
   wherein the evaluation value of each query image candidate is computed by calculating a height pixel count of a standing person in the each query image candidate, and normalizing the calculated height pixel count to yield the evaluation value.

13. A non-transitory storage medium storing a program executable by a computer to:
   acquire a plurality of query image candidates;
   detect, for each query image candidate, a two-dimensional skeletal structure of a person included in the each query image candidate;
   compute, for each query image candidate, an evaluation value, based on the two-dimensional skeletal structure of the person included in the each query image candidate, the evaluation value of each query image candidate indicating an extent to which a feature value computable from the each query image candidate is indicative of a pose of the person;
   select, from among the query image candidates, a query image to be used for image search, based on the evaluation value computed for each query image candidate;
   compute a feature value of the two-dimensional skeletal structure of the person included in the query image candidate selected as the query image; and
   perform the image search by retrieving, from among a plurality of images, a target image including a feature value with a highest a degree of similarity to the computed feature value, as a target image including a pose most similar to the pose of the person in the query image candidate selected as the query image,
   wherein the evaluation value of each query image candidate is computed by calculating a height pixel count of a standing person in the each query image candidate, and normalizing the calculated height pixel count to yield the evaluation value.

* * * * *